(12) United States Patent
Nagano

(10) Patent No.: US 10,621,334 B2
(45) Date of Patent: Apr. 14, 2020

(54) ELECTRONIC DEVICE AND SYSTEM

(71) Applicant: Renesas Electronics Corporation, Tokyo (JP)

(72) Inventor: Seishiro Nagano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 385 days.

(21) Appl. No.: 15/468,050

(22) Filed: Mar. 23, 2017

(65) Prior Publication Data
US 2017/0293753 A1    Oct. 12, 2017

(30) Foreign Application Priority Data

Apr. 7, 2016    (JP) .................................. 2016-077118

(51) Int. Cl.
*G06F 21/51*    (2013.01)
(52) U.S. Cl.
CPC .................................... *G06F 21/51* (2013.01)
(58) Field of Classification Search
CPC ..................................................... G06F 21/51
See application file for complete search history.

(56) References Cited

U.S. PATENT DOCUMENTS

| | | | |
|---|---|---|---|
| 7,063,253 B1 * | 6/2006 | Brausch .................. | G06F 21/10 235/379 |
| 7,971,783 B1 * | 7/2011 | Crews ..................... | G06F 21/57 235/379 |
| 8,756,414 B2 | 6/2014 | Saitoh | |
| 2006/0179487 A1 * | 8/2006 | Hatakeyama ....... | G06F 12/1458 726/26 |
| 2006/0230451 A1 * | 10/2006 | Kramer .................. | G06F 21/51 726/22 |
| 2007/0067831 A1 * | 3/2007 | Matsuda ................. | G06F 21/33 726/5 |
| 2008/0222407 A1 * | 9/2008 | Carpenter ............. | G06F 21/575 713/2 |
| 2008/0229426 A1 * | 9/2008 | Saitoh ..................... | G06F 21/10 726/26 |

(Continued)

FOREIGN PATENT DOCUMENTS

| | | |
|---|---|---|
| JP | 2008-226160 A | 9/2008 |
| JP | 2013-114620 A | 6/2013 |
| JP | 2014-211473 A | 11/2014 |

*Primary Examiner* — Yonas A Bayou
(74) *Attorney, Agent, or Firm* — McDermott Will & Emery LLP

(57) ABSTRACT

In a system including a terminal device where a plurality of apps are installed and can be executed and a management device capable of communicating with the terminal device; even if the terminal device does not have an advanced security function such as a secure boot, the validity of apps is determined in conjunction with the reliable management device. The management device stores specific values uniquely calculated respectively from a plurality of apps installed on the terminal device, as a plurality of installation-time specific values. The system causes the terminal device to calculate a specific value uniquely calculated from one app, as an execution-time specific value, and determines that the app is authentic if the calculated execution-time specific value matches one of the installation-time specific values stored in the management device.

14 Claims, 24 Drawing Sheets

(56) References Cited

U.S. PATENT DOCUMENTS

| | | | | |
|---|---|---|---|---|
| 2011/0044451 A1* | 2/2011 | Anzai | ................ | G06F 21/51 |
| | | | | 380/45 |
| 2011/0099623 A1* | 4/2011 | Garrard | ................ | H04L 63/126 |
| | | | | 726/14 |
| 2012/0018511 A1* | 1/2012 | Hammad | ................ | G06Q 20/12 |
| | | | | 235/380 |
| 2012/0031969 A1* | 2/2012 | Hammad | ................ | G06F 21/34 |
| | | | | 235/380 |
| 2013/0139270 A1* | 5/2013 | Yoshida | ................ | G06F 21/575 |
| | | | | 726/26 |
| 2015/0381347 A1* | 12/2015 | Fukushima | ............ | H04L 9/004 |
| | | | | 380/28 |

* cited by examiner

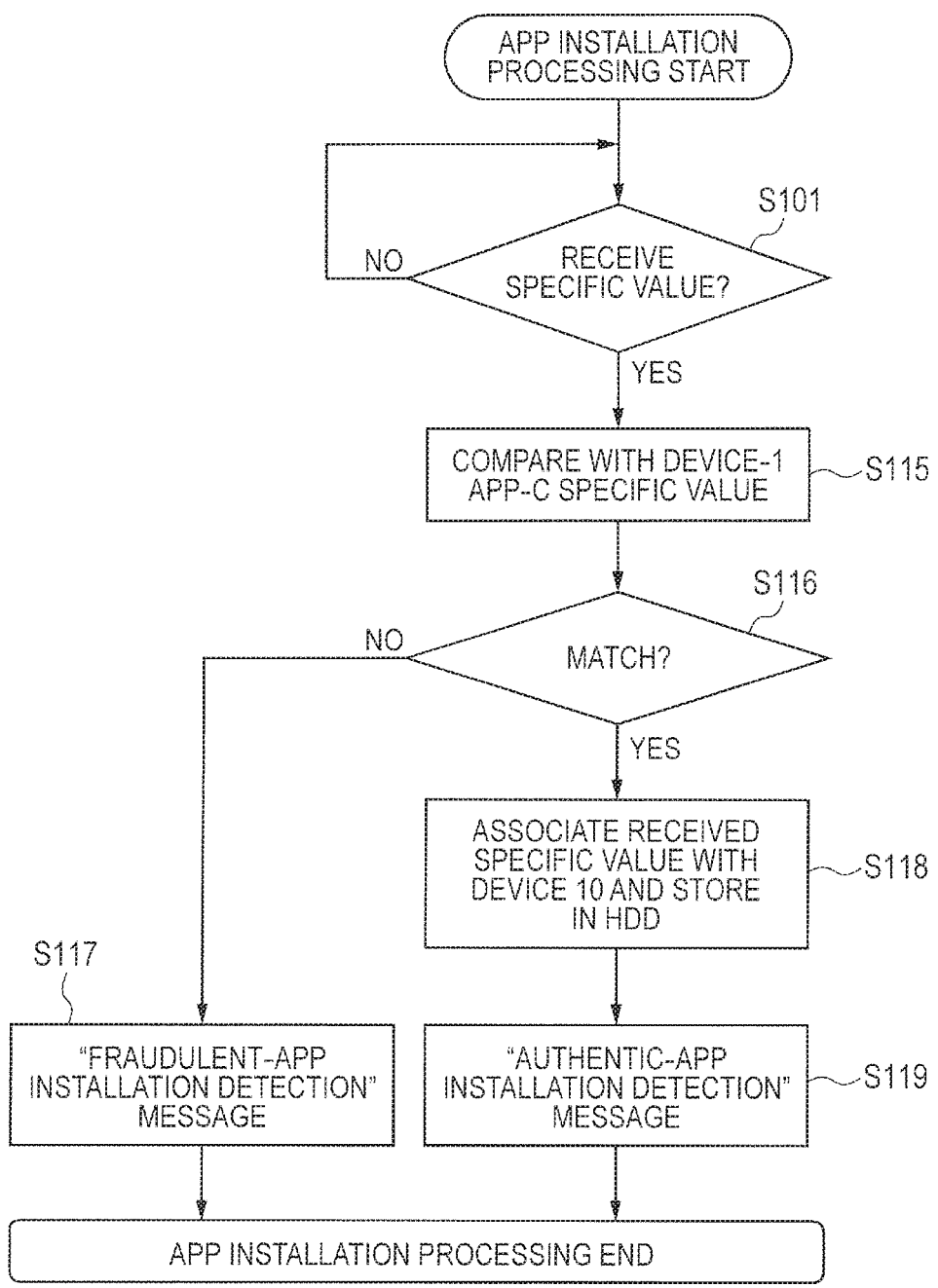

ELECTRONIC DEVICE AND SYSTEM

CROSS-REFERENCE TO RELATED APPLICATIONS

The disclosure of Japanese Patent Application No. 2016-077118 filed on Apr. 7, 2016 including the specification, drawings and abstract is incorporated herein by reference in its entirety.

BACKGROUND

The present invention relates to an electronic device and a system, and is particularly suited to the prevention of influence, on a system including an electronic device, of a fraudulent operation by fraudulent software installed on the simple electronic device not having a secure boot function.

There is a secure boot as one of functions for preventing information in an electronic device such as a computer or a smartphone from being stolen or destroyed when fraudulent software such as malware is installed on the electronic device and a fraudulent operation is executed. Software provided from the outside is authenticated by a provider or a trusted third party, distributed with an electronic signature, and installed on the electronic device. In a bootup routine at power-on, the electronic device where the software has been installed verifies the electronic signature, confirms that the software is an authentic one provided from a reliable site, and then initiates the software. In this case, the software widely includes medium- and low-level software such as general application software, middleware for communication, a network interface, etc., and driver software, and an operating system (OS).

Japanese Unexamined Patent Publication No. 2008-226160 (Patent Document 1) discloses an information processing device capable of verifying the validity of software even if a certificate becomes invalid and a digital signature is invalidated. When the certificate is not invalidated and the validity of the software is confirmed, a value uniquely calculated from the software is calculated and stored in a storage means. When the digital signature is invalidated, a value uniquely calculated in the same way from the software is calculated and collated with the value stored in the storage means. In the case of a match, it is determined that the software is authentic.

Japanese Unexamined Patent Publication No. 2013-114620 (Patent Document 2) discloses an information processing device capable of surely notifying the fact that the validity of a program executed by a processor for controlling a device is not confirmed. The information processing device includes a second processor in addition to the first processor for controlling the device, and the second processor verifies the validity of the program executed by the first processor at startup of the information processing device. If the validity is confirmed, the first processor is activated. If the validity is not confirmed, an exception notification of unusual state is made by a means different from a user interface of the first processor.

Japanese Unexamined Patent Publication No. 2014-211473 (Patent Document 3) discloses an integrity verification system in which, based on integrity verification of communication data, a configuration device of the system is operated in an adequate case, and the configuration device is not operated to prevent the erroneous control of the configuration device in an inadequate case. A first control device generates data for integrity verification of communication data, and transmits it along with the communication data to a second control device and a detection server. The detection server acquires additional information for verification as necessary, performs integrity verification processing on the communication data received from the first control device, and transmits a verification result to the second control device and a control server. The second control device does not perform a control task based on the communication data until receiving the verification result of the integrity of the communication data from the detection server. If the verification result transmitted from the detection server indicates adequateness, the second control device performs the control task according to the communication data. If the verification result indicates inadequateness, the second control device does not perform the control task according to the communication data, and transmits an error to the first control device.

SUMMARY

The present inventors have examined Patent Documents 1, 2, and 3, and found the following new problem.

In the IoT (Internet of Things) and the like, multiple electronic devices are connected to a network, so that a terminal device such as an activity meter can transmit information to the Internet. Therefore, there is an urgent need to build a self protection system against attacks that steal or falsify data such as personal information by installing fraudulent software such as malware on the terminal device. It is theoretically possible to verify the validity of software by incorporating the secure boot function into the terminal device. However, in general, public key cryptography is applied to the secure boot system, which requires an enormous amount of computation of arithmetic processing for encryption and decryption. According to a trial calculation by the present inventors, several milliseconds of arithmetic time is required, using e.g. a multi-core CPU (Central Processing Unit) with gigabytes of large-capacity memory, in the related art electronic device where the secure boot system is incorporated. On the other hand, it is virtually impossible to incorporate an arithmetic circuit that can bear such an amount of computation into the terminal device. The terminal device that is e.g. an activity meter is required to be small and lightweight at a low cost. In practice, it is not allowed to increase the cost by incorporating a dedicated encryption arithmetic circuit that enables the secure boot to function as in the related art device and shorten battery life with an increase in power consumption or increase the size of the battery to maintain the life.

On the other hand, as in the integrity verification system disclosed in Patent Document 3, there is a possible solution to cause the other device having a high arithmetic capability in place of the terminal device to have the secure boot function. In Patent Document 3, the communication data instead of software is subjected to integrity verification, and it is assumed that the communication data is originally transmitted to the other device. Therefore, in the other device which receives the communication data, the integrity verification of the communication data does not cause large overhead in particular. On the other hand, the problem addressed by the present inventors is software, which is not assumed to be transmitted to the other device, and the integrity verification system disclosed in Patent Document 3 cannot be applied to the terminal device in the IoT or the like. This is because the transmitting of software itself to cause the other device to execute the secure boot causes large overhead and how to verify the validity of communication control software for the transmission has not been solved.

In the information processing system disclosed in Patent Document 2, it is necessary to further incorporate the second processor to confirm the validity of the program executed by the first processor, so that the above problem such as cost increase cannot be solved.

In the information processing device disclosed in Patent Document 1, since the value uniquely calculated from the software is calculated and stored when the validity of the software is guaranteed, it is only necessary to calculate the "uniquely calculated value" and collate it with the stored value as an amount of computation to verify the validity of the software after the certificate is invalidated. Therefore, if only this part can be applied, the above problem might be solved. However, the present application assumes that fraudulent software is installed and performs a fraudulent operation. If, in the first place, it is possible to protect against the installation of fraudulent software by verification with the certificate using the electronic signature at the time of installation, the premise of the above problem disappears. On the other hand, as for the fraudulent software installed by deceiving the verification at the time of installation by the forgery of the electronic signature; at the time of installation, the software is determined to be authentic, and the "uniquely calculated value" is calculated. Therefore, even if the method disclosed in Patent Document 1 is applied, the problem of the present application cannot be solved.

Means for solving such a problem will be described below, and the other problems and novel features will become apparent from the description of this specification and the accompanying drawings.

One embodiment is as follows.

That is, a system including a first device where one or a plurality of pieces of software are installed and can be executed and a second device capable of communicating with the first device is configured as follows.

The second device stores specific values uniquely calculated respectively from the one or plurality of pieces of software installed on the first device, as one or a plurality of installation-time specific values.

The system causes the first device to calculate a specific value uniquely calculated from one piece of software, as an execution-time specific value, and determines that the software is authentic if the calculated execution-time specific value matches one of the one or plurality of installation-time specific values stored in the second device.

An effect obtained by the one embodiment will be briefly described as follows.

That is, even if the first device does not have an advanced security function such as the secure boot, it is possible to determine the validity of software in conjunction with the reliable second device.

BRIEF DESCRIPTION OF THE DRAWINGS

FIG. 24 is a flowchart showing an operation example of the device 100 of app installation processing according to the fourth embodiment.

DETAILED DESCRIPTION

Figure 1:
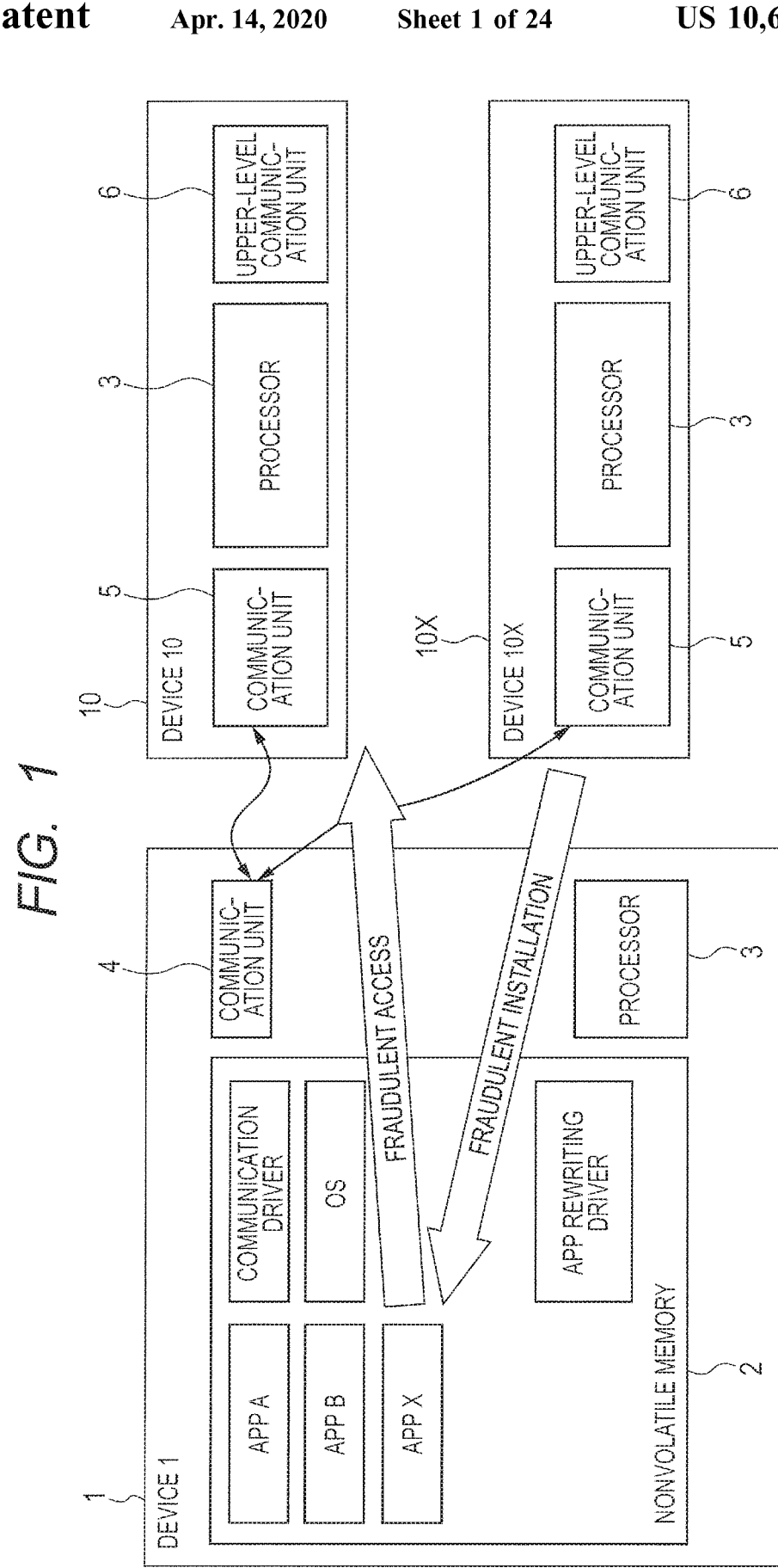
FIG. 1 is a diagram for explaining a problem.

Hereinafter, embodiments will be described in detail. In all the drawings for illustrating modes for carrying out the invention, elements having the same functions are denoted by the same reference numerals, and their description will not be repeated. In this application, software subjected to validity determination widely includes medium- and low-level software such as general application software, middleware for communication, a network interface, etc., and driver software, and may include at least a part of an operating system (OS) such as a library included in the OS. In the following embodiments and the accompanying drawings, general application software as software subjected to validity determination will be described by way of a typical example, and abbreviated as "app". That is, the "app" can be interpreted as "arbitrary software subjected to validity determination in this application".

Prior to the detailed description of the embodiments, the problem to be solved will be explained in further detail.

FIG. 1 is a diagram for explaining the problem. A device 1 is a terminal device such as an activity meter or a dashcam, and includes a processor 3, a communication unit 4, and a nonvolatile memory 2. The nonvolatile memory 2 stores various kinds of software such as an app A and an app B as application software, a communication driver, the OS, and an app rewriting driver, which are executed by the processor 3. A device 10 is a device such as a PC (Personal Computer) or a smartphone, and includes a processor 3, a communication unit 5 which is an interface with the device 1, and an upper-level communication unit 6 which is an interface with an upper-level network such as the Internet. A device 10X will be described later. Many of the related art terminal devices 1 such as activity meters and dashcam do not have a network communication function such as LAN (Local Area Network) nor a wireless communication function, but have a wired connection terminal for one-to-one connection to the device 10 such as the PC or the smartphone. That is, the communication unit 4 and the communication unit 5 are, for example, an interface such as USB (Universal Serial Bus). Therefore, data acquired by a sensor (not shown) mounted on the device 1 is transferred by one-to-one connection by wire to the device 10 such as the PC or the smartphone, and can be browsed through the device 10. Further, to receive services using the result of analyzing data, the device 10 such as the PC or the smartphone can transmit data to a server through the Internet. An app for the device 1 is downloaded from the server to the device 10 such as the PC or the smartphone through the Internet, the device 10 is connected by wire to the device 1, and the downloaded app is transferred to the device 1, so that the app is installed and updated.

In the IoT, there is proposed a system, with such a configuration developed, for transmitting data acquired by the device 1 to the server through the Internet from the device 10 such as the PC or the smartphone in real time. Further, there is proposed service that can be provided only by collecting data from multiple devices by transmitting data from multiple devices besides the device 1. On the other hand, in the related art method of the one-to-one connection of the device 1 to the device 10 by wire, there is troublesomeness of preparing a cable, handling the cable (including the length), and the like; therefore, it is replaced with many-to-one or many-to-many network connection, and wired connection is replaced with wireless connection.

This makes it possible to periodically upload collected information, which improves convenience; however, security vulnerability occurs. In comparison with the wired connection, the wireless connection facilitates connection trial from an arbitrary device 10. This increases the possibility that a malicious device 10X installs a fraudulent app X onto the device 1 in FIG. 1, in comparison with the one-to-one wired connection. At this time, in the case of not being equipped with a feature for verifying the validity of the installed app such as the secure boot function, it is not possible to notice that the fraudulent app X is installed on the device 1. Therefore, even when the original authentic device 10 instead of the malicious device 10X is connected to the device 1, it is not possible to inhibit the activation of the fraudulent app X, which permits various security attacks. For example, there are possible troubles that data transmitted from the device 1 is falsified so that the device 10 cannot receive appropriate services, the device 1 transmits data to an unspecified device 10 so that personal information is stolen, and an authentic app is falsified (e.g., a charged function is always turned on) by the fraudulent app.

In such a case, generally, in order to detect the fraudulent app of the device 1 and the falsification of the authentic app to prevent the execution thereof, the secure boot may be implemented in the device 1. However, since it is hard to implement the secure boot, at present the secure boot is incorporated only in some of expensive products such as personal computers and smartphones, and there is a problem that it is difficult to incorporate the secure boot into inexpensive products in terms of cost.

First Embodiment

Figure 2:
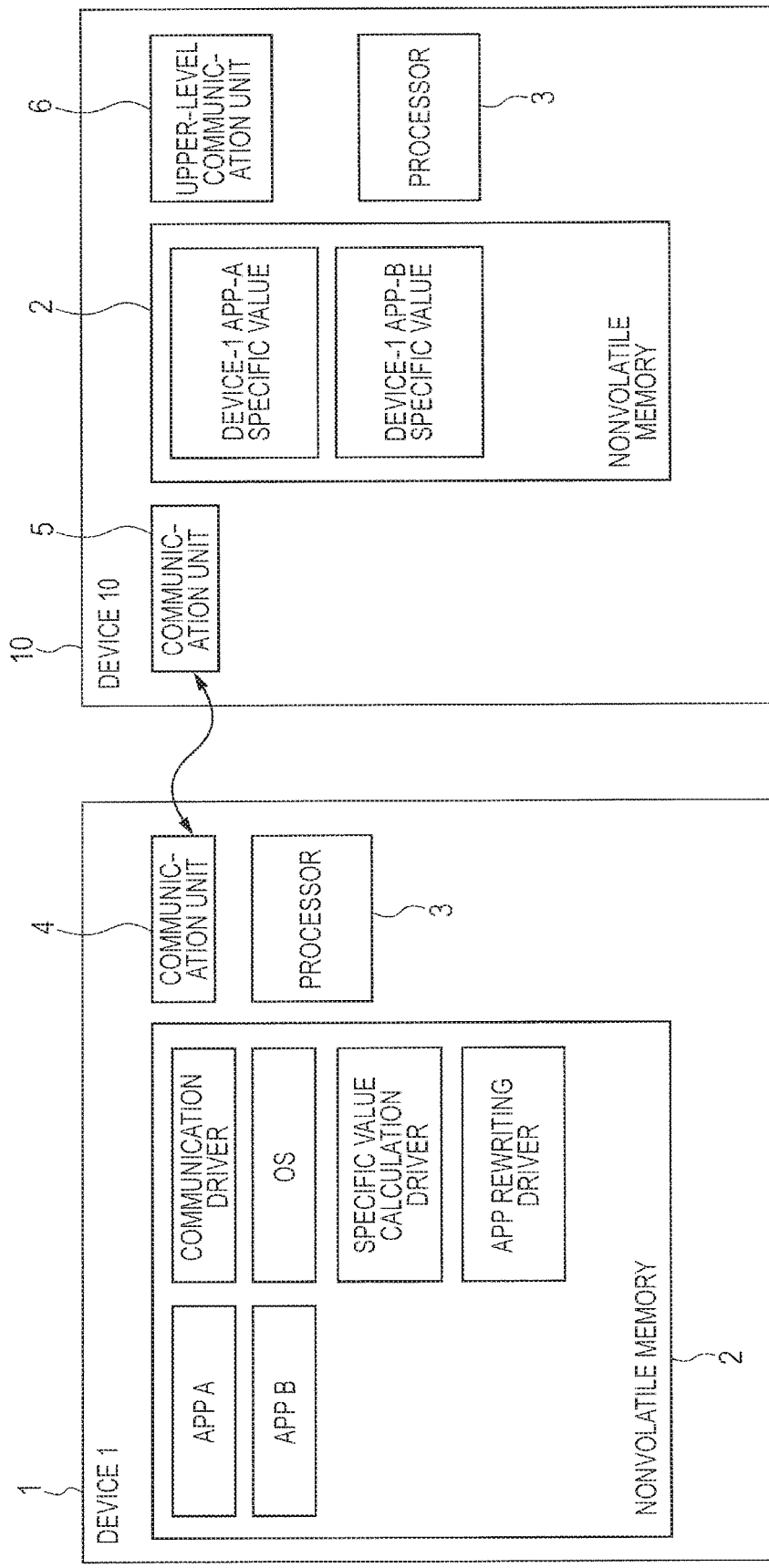
FIG. 2 is a schematic block diagram of a system including a device 1 and a device 10, according to a first embodiment.

FIG. 2 is a schematic block diagram of a system including the device 1 and the device 10, according to the first embodiment.

The device 1 is an electronic device including the nonvolatile memory 2 which is an example of a storage device where software can be installed, the processor 3 capable of executing the software, and the communication unit 4 which is an interface capable of communicating with the other device 10, and is, for example, an activity meter or a dashcam. The other device 10 stores specific values uniquely calculated respectively from one or a plurality of pieces of software installed on the device 1, as one or a plurality of installation-time specific values.

The specific value uniquely calculated from software is a value that is irreversibly and uniquely determined by inputting all or part of the execution instruction code or source code of software, and is preferably, e.g., a hash value or a MAC (Message Authentication Code). The installation-time specific value is calculated only for software subjected to validity determination. The software subjected to validity determination is normally application software (app), but is not necessarily limited thereto, and may include various kinds of drivers and part (library) of the OS.

The device 1 calculates a specific value corresponding to at least one piece of installed software subjected to validity determination, as an execution-time specific value. The calculated execution-time specific value of the software subjected to validity determination is compared with the installation-time specific value. At this time, the comparison between the execution-time specific value and the installation-time specific value may be performed by the device 1 or by the device 10. Alternatively, in a system configuration different from the configuration shown in FIG. 2, the comparison may be performed by another device different from the devices 1 and 10. The installation-time specific value can be stored outside the device 1, and the device for storage is not necessarily identical to the device for comparison. If the result of the comparison between the execution-time specific value and the installation-time specific value indicates a match, the device 1 determines that the software is authentic. In the case of a plurality of pieces of software subjected to validity determination, installation-time specific values are calculated beforehand for all pieces of target software and stored in the device 10, as a premise. At the time of validity determination, execution-time specific values are calculated for all pieces of target software, and compared with the corresponding installation-time specific values. In the case of all matches, since fraudulent software is not detected, normal processing is started. On the other hand, if fraudulent software is detected, predetermined error processing for cutting off communication and deleting the software is executed as a countermeasure.

Thereby, even if the device 1 itself does not have an advanced security function such as the secure boot, it is possible to determine the validity of software in conjunction with the reliable external device 10.

Further detailed description will be made with reference to FIG. 2. The nonvolatile memory 2 of the device 1 stores the OS, the communication driver, the app rewriting driver, and the apps A and B as application software. In this embodiment, the nonvolatile memory 2 further stores a specific value calculation driver, which is executed by the processor 3, thereby calculating the installation-time specific value and the execution-time specific value. The communication unit 4 is, for example, an interface for wireless communication with the device 10, and the processor 3 executes the communication driver, thereby enabling communication conforming to a standard. The device 10 includes a nonvolatile memory 2, the processor 3, the communication unit 5, and the upper-level communication unit 6. The nonvolatile memory 2 stores an OS and a communication driver (not shown). The processor 3 executes a communication driver for the communication unit 5, thereby enabling wireless communication with the device 1, and the processor 3 executes a communication driver for the upper-level communication unit 6, thereby enabling communication with an upper-level network such as Ethernet (registered trademark). The nonvolatile memory 2 of the device 10 stores specific values (installation-time specific values) obtained when the app A and the app B are installed respectively on the device 1. The word "installation-time", that is, "at the time of installation" is not necessarily limited to a time when the app is newly installed, and may be a time when the device 1 where the app is installed beforehand is connected to the device 10 for the first time.

Generally, in the secure boot, there is performed signature verification by a public key cryptosystem to determine the validity of the distribution source of the app. Due to the enormous amount of computation of public key cryptography, the signature verification requires a platform of high arithmetic performance if executed by software, or requires the implementation of dedicated hardware, which increases the cost; therefore, it is impossible to implement it in an inexpensive device. Accordingly, in the first embodiment, a user of the device 10 in FIG. 2 or a manufacturer or the like (specifically, a server of the manufacturer) of the device 1 needs to confirm the validity of the distribution source of the app. In this embodiment, the user of the device 10 is reliable, and the app installed from the device 10 onto the device 1 is guaranteed to be authentic.

In the case where another device can be connected via a wireless network or the like in communication between the device 1 and the device 10, the malicious device 10X can invade the wireless network and install the fraudulent app X onto the device 1 as shown in FIG. 1. The fraudulent app X operates on the device 1, which permits various security attacks as described above. However, in general, it is unlikely that the malicious device 10X still invades or is still connected to the wireless network to continue the various security attacks. Even if such a situation arises, it is possible to take protection measures for detecting and excluding the fraudulent device by various known methods such as monitoring the wireless network, against an attack mode in which the fraudulent device is connected to and participates in the network. On the other hand, there is a problem that the fraudulent app X continues operating on the device 1 and continues the various security attacks through the authentic device 10 even after the malicious device 10X is disconnected from the network.

In the first embodiment, when the fraudulent app X is installed onto the device 1, it is not possible to determine that the app X is fraudulent, and the installation-time specific value corresponding to the app X is calculated. At this time, it is also not possible to detect that the device 10X as the entity of the installation has malice, so that the device 1 transmits the installation-time specific value corresponding to the app X to the device 10X. Then, the malicious device 10X is disconnected from the network, and the authentic device 10 operates the device 1. At this time, the execution-time specific values of the app A, the app B, and the app X installed on the device 1 are calculated. The authentic device 10 stores the installation-time specific values corresponding to the authentic apps A and B in the nonvolatile memory 2, but does not store the installation-time specific value corresponding to the fraudulent app X. This is because the installation-time specific value corresponding to the app X is sent back to the device 10X as the installation entity, but is not transmitted to the device 10. Therefore, there is no value that the execution-time specific value of the app X calculated by the device 1 is compared with, so that there is no match; therefore, it is determined that the app X is fraudulent.

In order that the device 1 alone verifies the validity of software, there is required an advanced security function such as the secure boot with the enormous amount of computation such as the signature verification using the public key cryptosystem. On the other hand, in the first embodiment, it is possible to determine the validity of software in conjunction with the reliable device disposed outside the device 1, and therefore to greatly simplify the calculation of the specific value. As described above, the specific value is a value that is irreversibly and uniquely determined by inputting all or part of the execution instruction code or source code of software, and can be, for example, a hash value or a MAC. Further, at this time, instead of the public key cryptosystem, a common key cryptosystem whose amount of computation is much lighter than that of the public key cryptosystem can be used. Further, since the common key cryptosystem is also used in communication (e.g., Bluetooth (registered trademark)) using the communication unit 4 and the communication driver in terminal devices such as the device 1, the same arithmetic circuit or arithmetic library can be shared among specific value calculation drivers.

The operations of the devices 1 and 10 will be described in more detail.

As described above, the comparison between the installation-time specific value and the execution-time specific value may be performed by the device 1, by the device 10, or by any other device. In this embodiment, an operation example in which the comparison between the installation-time specific value and the execution-time specific value is performed by the device 10 will be described. In a second embodiment, an operation example in which the comparison is performed by the device 1 will be described. In third and fourth embodiments, operation examples in which the comparison is performed by any other device will be described.

Figure 3:
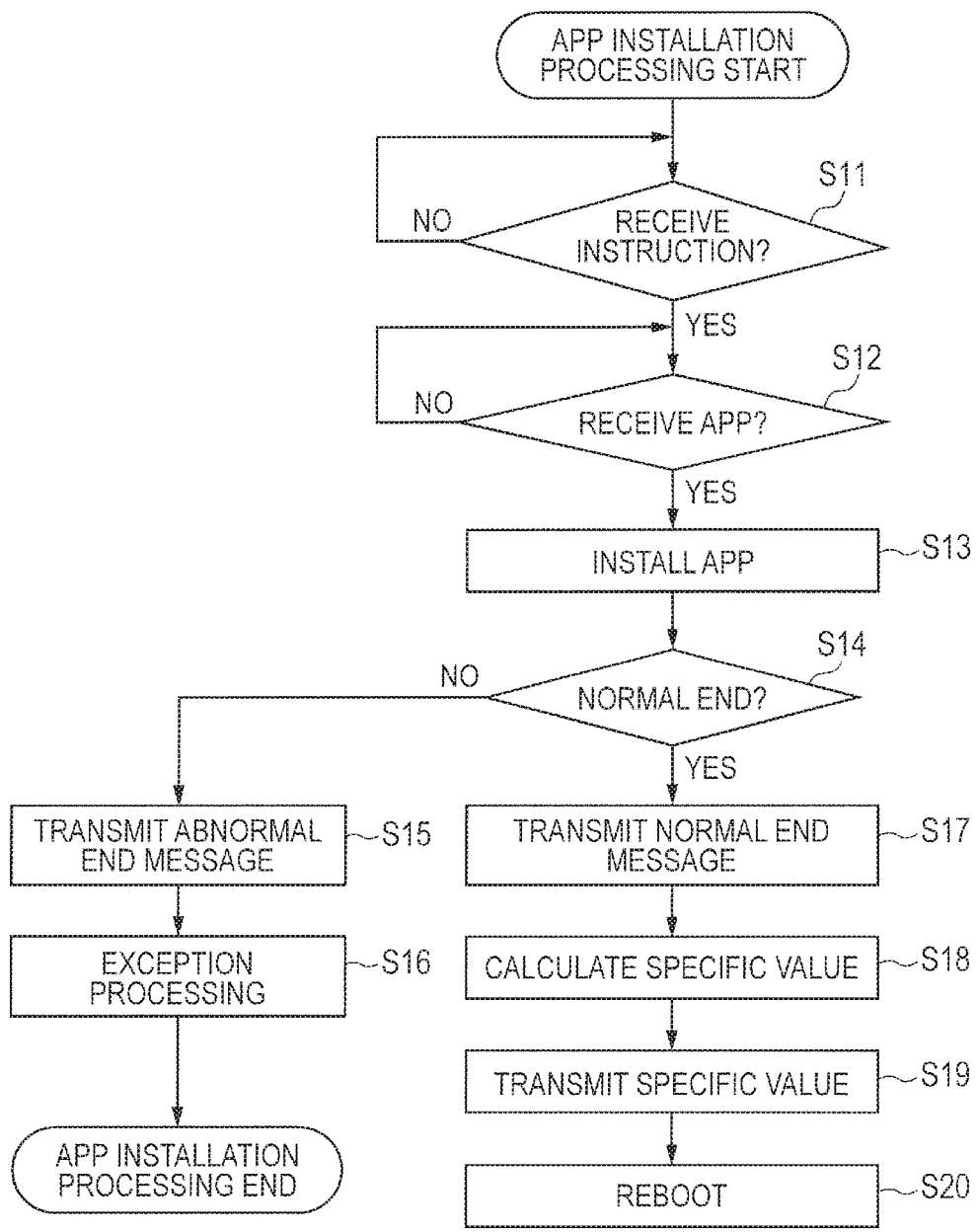
FIG. 3 is a flowchart showing an operation example of app installation processing by the device 1, according to first, second, and third embodiments.
Figure 4:
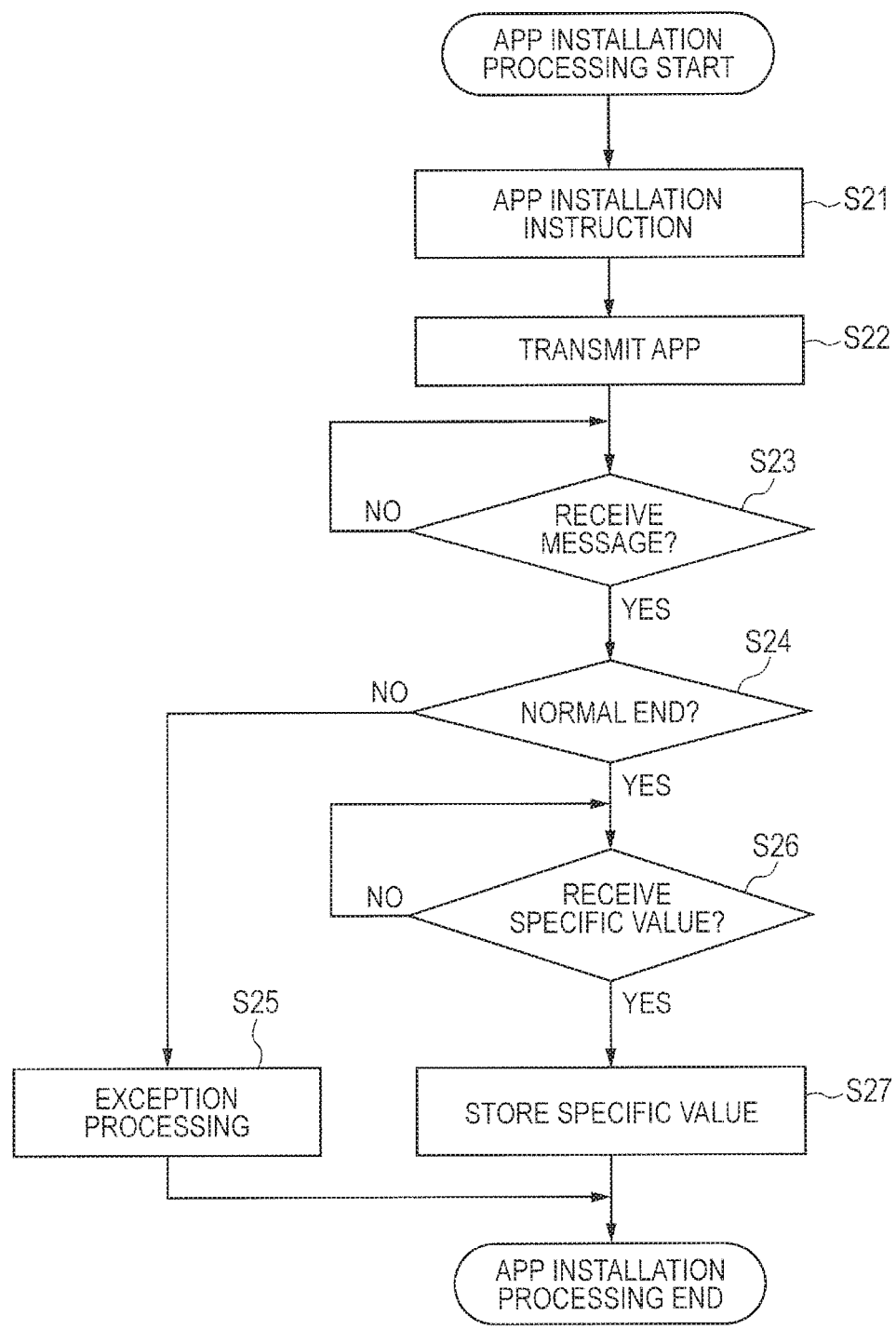
FIG. 4 is a flowchart showing an operation example of app installation processing by the device 10, according to the first, second, and third embodiments.

FIGS. 3 and 4 are flowcharts showing an operation example of app installation processing from the device 10 to the device 1, in which FIG. 3 shows the operation of the device 1, and FIG. 4 shows the operation of the device 10. As a premise, the device 10 downloads and stores a new authentic app in the nonvolatile memory 2 in the device 10 (not shown in FIG. 2), and the devices 1 and 10 perform connection processing through the communication units 4 and 5 beforehand and are in a communicable state.

The devices 1 and 10 start the app installation processing. The device 10 transmits an app installation instruction to the device 1 (S21), and then transmits a new app (S22) (FIG. 4). When the device 1 receives the app installation instruction from the device 10 (S11) and then receives the new app (S12), the device 1 installs the received new app, using the app rewriting driver (S13) (FIG. 3). If the installation is normally ended, the device 1 transmits a normal end message to the device 10 (S17), calculates an installation-time specific value corresponding to the new app installed on the device 1 (S18), transmits the value (S19), and reboots the device 1 (S20) (FIG. 3). On the other hand, if the installation is abnormally ended, the device 1 transmits an abnormal end message to the device 10 (S15), performs exception processing (S16), and ends the app installation processing (FIG. 3). If the device 10 receives the normal end message from the device 1 (S23, S24), the device 10 receives the installation-time specific value corresponding to the new app (S26), stores the received installation-time specific value in the nonvolatile memory 2 (S27), and ends the app installation processing (FIG. 4). On the other hand, if the device 10 receives the abnormal end message, the device 10 performs exception processing (S25), and ends the app installation processing (FIG. 4).

Next, fraudulent app detection processing will be described.

Figure 5:
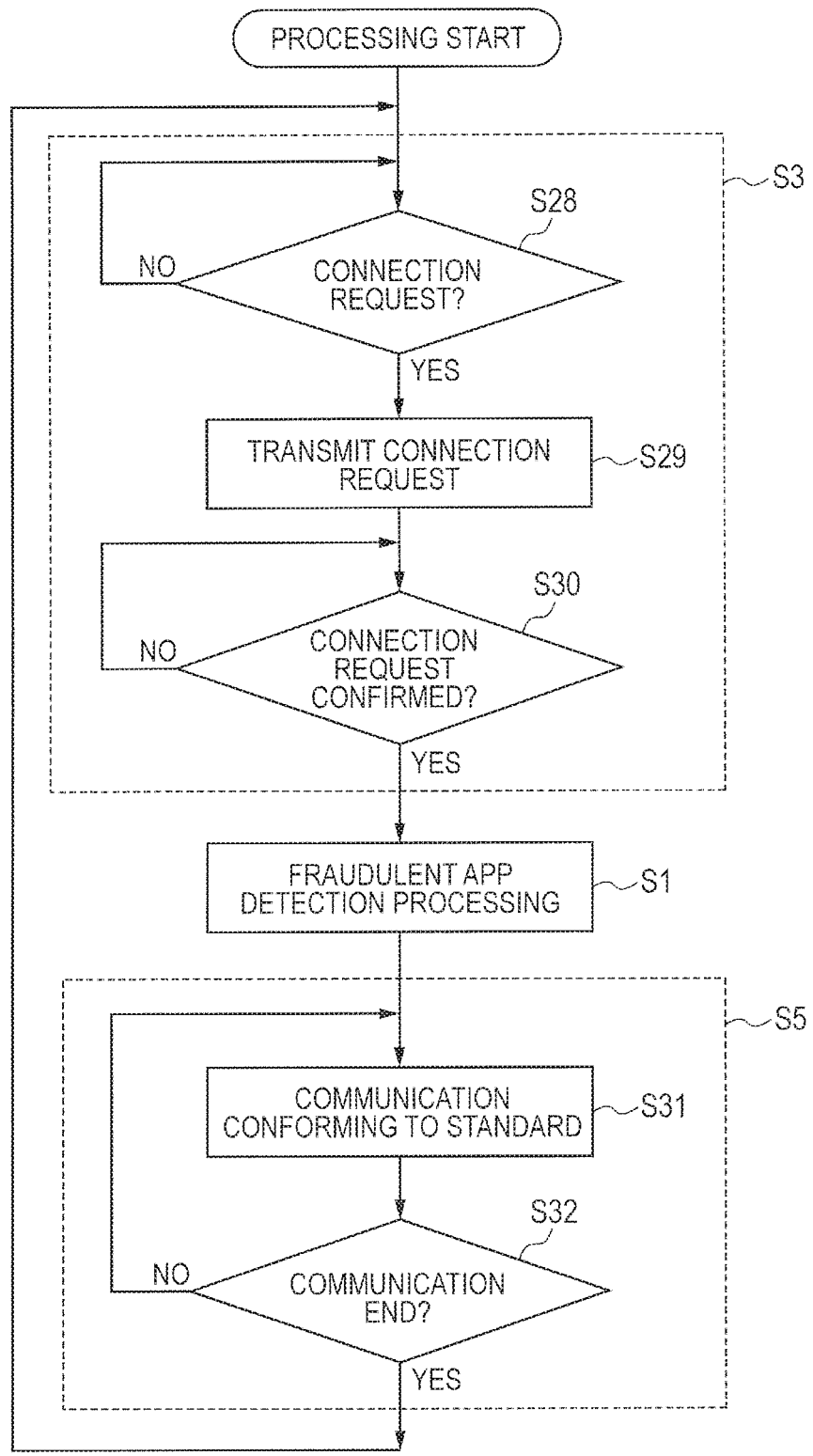
FIG. 5 is a flowchart showing an operation example of the device 1 executing connection processing, fraudulent app detection processing, and communication processing between the devices 1 and 10.
Figure 6:
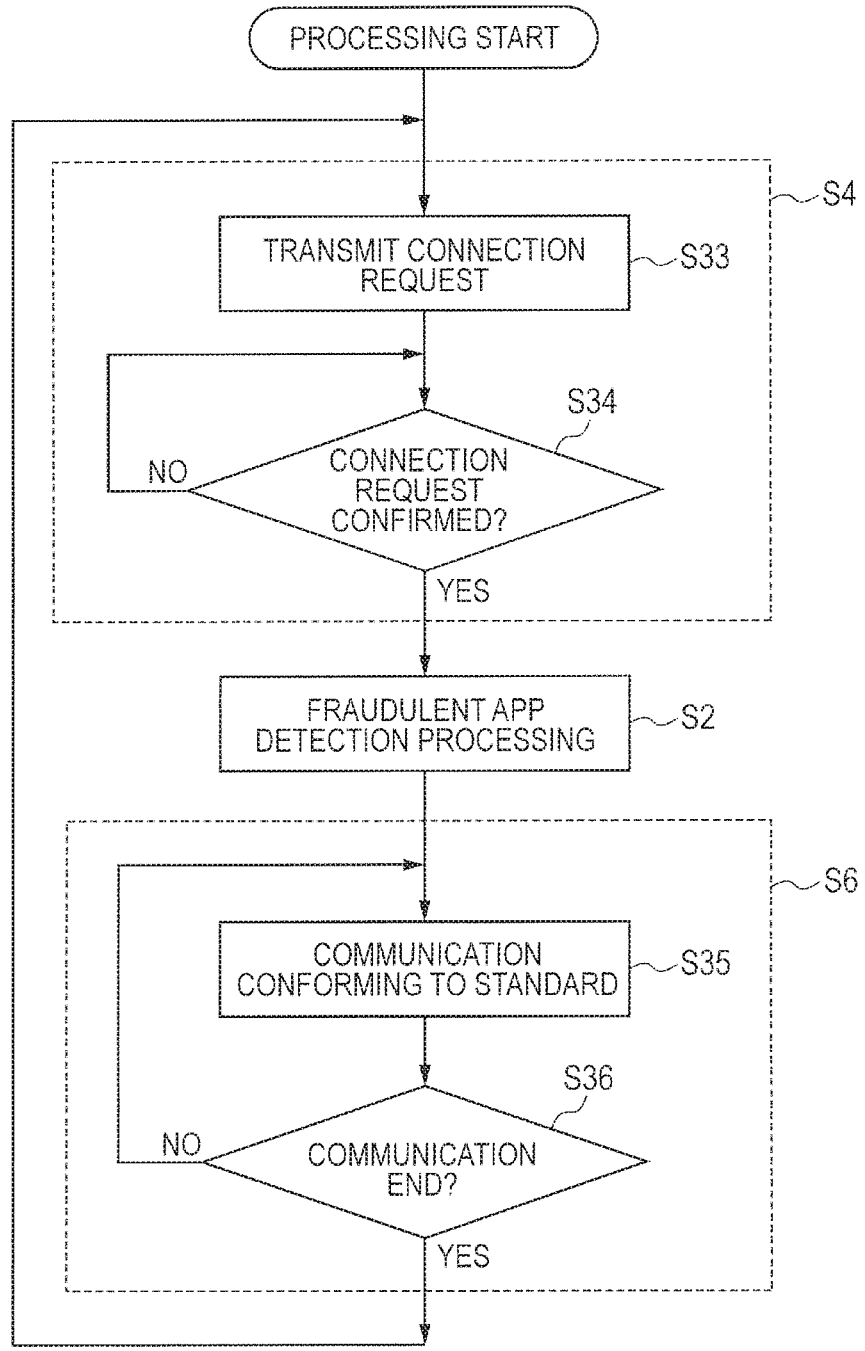
FIG. 6 is a flowchart showing an operation example of the device 10 executing connection processing, fraudulent app detection processing, and communication processing between the devices 1 and 10.

FIGS. 5 and 6 are flowcharts showing an operation example of connection processing, fraudulent app detection processing, and communication processing which are executed between the devices 1 and 10, in which FIG. 5 shows the operation of the device 1, and FIG. 6 shows the operation of the device 10. In general, for communication between the devices 1 and 10, connection processing (S3 in FIG. 5 and S4 in FIG. 6) is first performed, and when connection is established, communication processing (S5 in FIG. 5 and S6 in FIG. 6) is performed. Fraudulent app detection processing (S1 in FIG. 5 and S2 in FIG. 6) is preferably performed before the normal communication processing (S5 in FIG. 5 and S6 in FIG. 6) is started after the connection processing (S3 in FIG. 5 and S4 in FIG. 6) is completed and the connection is established.

The devices 1 and 10 first start the connection processing (S3 in FIG. 5 and S4 in FIG. 6). The device 10 transmits a connection request to the device 1 (S33), confirms a connection response from the device 1 (S34), and ends the connection processing (S4) (FIG. 6). When the device 1 receives the connection request from the device 10 (S28), the device 1 transmits the connection response, confirms a connection response from the device 10 (S30), and ends the connection processing (S3) (FIG. 5). When the devices 1 and 10 end the connection processing (S3 in FIG. 5 and S4 in FIG. 6), the devices 1 and 10 perform the fraudulent app detection processing (S1 in FIG. 5 and S2 in FIG. 6). If a fraudulent app is not detected, the devices 1 and 10 proceed to the normal communication processing (S5 in FIG. 5 and S6 in FIG. 6). In the normal communication processing, the devices 1 and 10 perform communication conforming to a standard until the end of the communication (S31, S32 in FIG. 5 and S35, S36 in FIG. 6).

Figure 7:
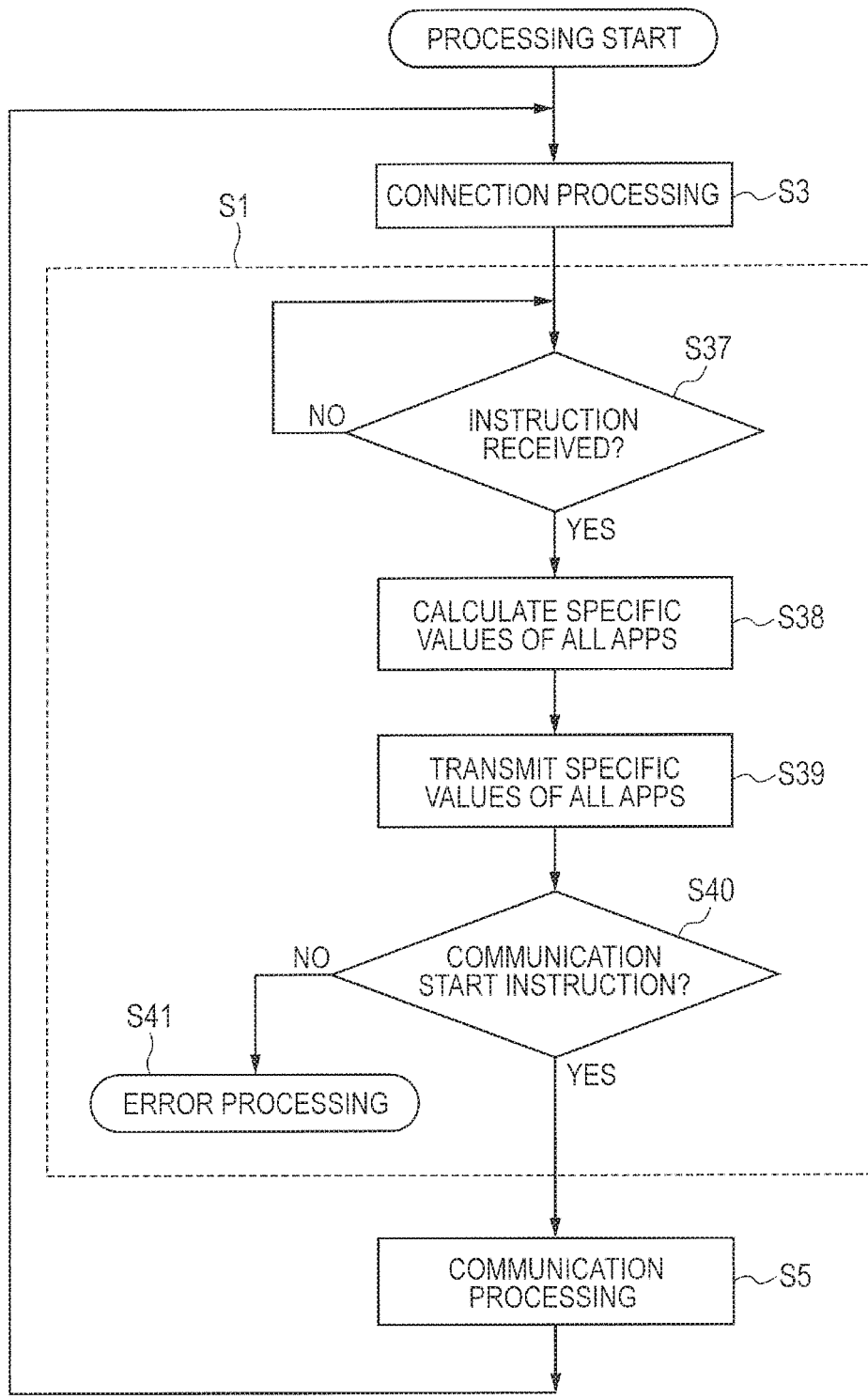
FIG. 7 is a flowchart showing an operation example of the device 1 in the case of performing error processing as an example of the fraudulent app detection processing according to the first embodiment.
Figure 8:
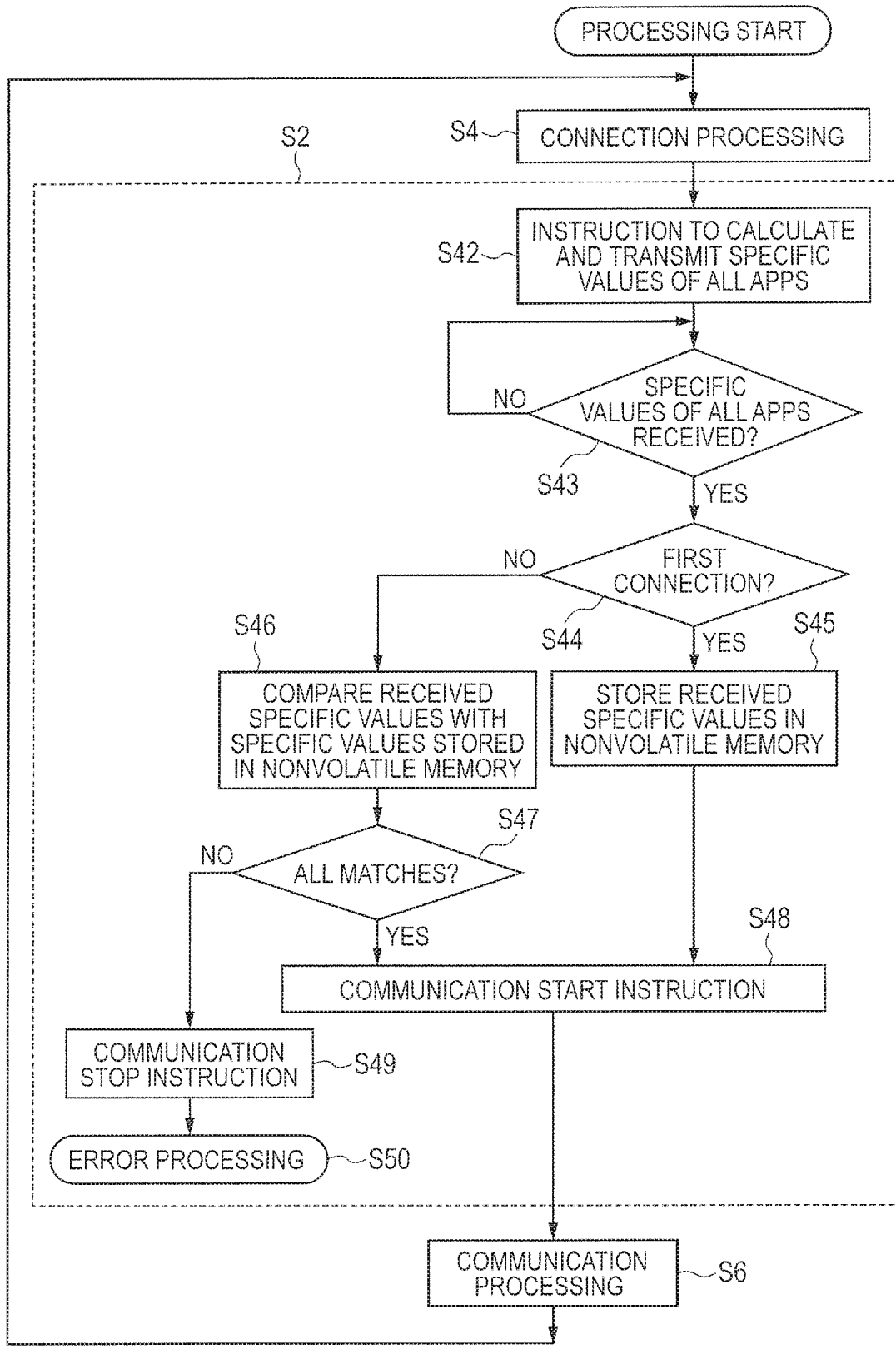
FIG. 8 is a flowchart showing an operation example of the device 10 in the case of performing error processing as an example of the fraudulent app detection processing according to the first embodiment.

FIGS. 7 and 8 are flowcharts showing an operation example in the case of performing error processing as an example of the fraudulent app detection processing, in which FIG. 7 shows the operation of the device 1, and FIG. 8 shows the operation of the device 10.

The devices 1 and 10 performs the connection processing (S3 and S4), and then starts the fraudulent app detection processing (S1 and S2). The device 10 transmits an app specific value calculation/transmission instruction to the device 1 (S42) (FIG. 8). When the device 1 receives the instruction (S37), the device 1 calculates the specific values of all apps stored in the nonvolatile memory 2 by the specific value calculation driver (S38), and transmits them to the device 10 (S39) (FIG. 7). The device 10 receives the specific values of all apps installed on the device 1 (S43) (FIG. 8).

In the case of the first connection between the devices 1 and 10, the device 10 stores the received specific values in the nonvolatile memory 2 (S45), transmits a communication start instruction to the device 1 (S48), ends the fraudulent app detection processing (S2), and starts the communication processing (S6) (FIG. 8). The words "the case of the first connection between the devices 1 and 10" are assumed to be the case where the user of the device 10 newly purchases and connects the device 1 to the owned device 10, and apps already pre-installed on the device 1 at this stage are guaranteed to be all authentic. This is because the apps that have not been installed from the device 10 but have already been pre-installed when the device 1 is newly purchased are installed by the manufacturer itself of the device 1 or by a third party trusted by the manufacturer of the device 1, so that the distribution source is reliable. Therefore, the specific values at this time are installation-time specific values, and are written to and stored in the nonvolatile memory 2 of the device 10.

On the other hand, in the case of the second or subsequent connection between the devices 1 and 10, the device 10 compares the specific values received from the device 1 with specific values stored in the nonvolatile memory 2 of the device 10 (S46) (FIG. 8). If a comparison result indicates all matches (S47), the device 10 transmits the communication start instruction to the device 1 (S48), ends the fraudulent app detection processing (S2), and starts the communication processing (S6) (FIG. 8). If the comparison result does not indicate all matches, the device 10 transmits a communication stop instruction to the device 1 (S49), performs error processing (S50), and then ends the fraudulent app detection processing (FIG. 8). If the device 1 receives the communication start instruction from the device 10 (S40), the device 1 ends the fraudulent app detection processing (S1), and starts the communication processing (S5). On the other hand, in the case of the communication stop instruction, the device 1 performs error processing (S41), and then ends the fraudulent app detection processing (FIG. 7).

The specific values calculated by the device 1 in the case of the second or subsequent connection between the devices 1 and 10 are execution-time specific values; however, the device 1 does not manage whether the connection is the first connection or the second or subsequent connection, and therefore does not distinguish between the installation-time specific value and the execution-time specific value. The collation between the execution-time specific value and the installation-time specific value is performed by the device 10, which can minimize an amount of computation on the device 1.

Next, as an example of the error processing in the case of detecting a fraudulent app, an operation example of deleting the fraudulent app will be described. The deletion processing of the fraudulent app may be regarded as a kind of the error processing, or may be regarded as processing substituted for the error processing.

Figure 9:
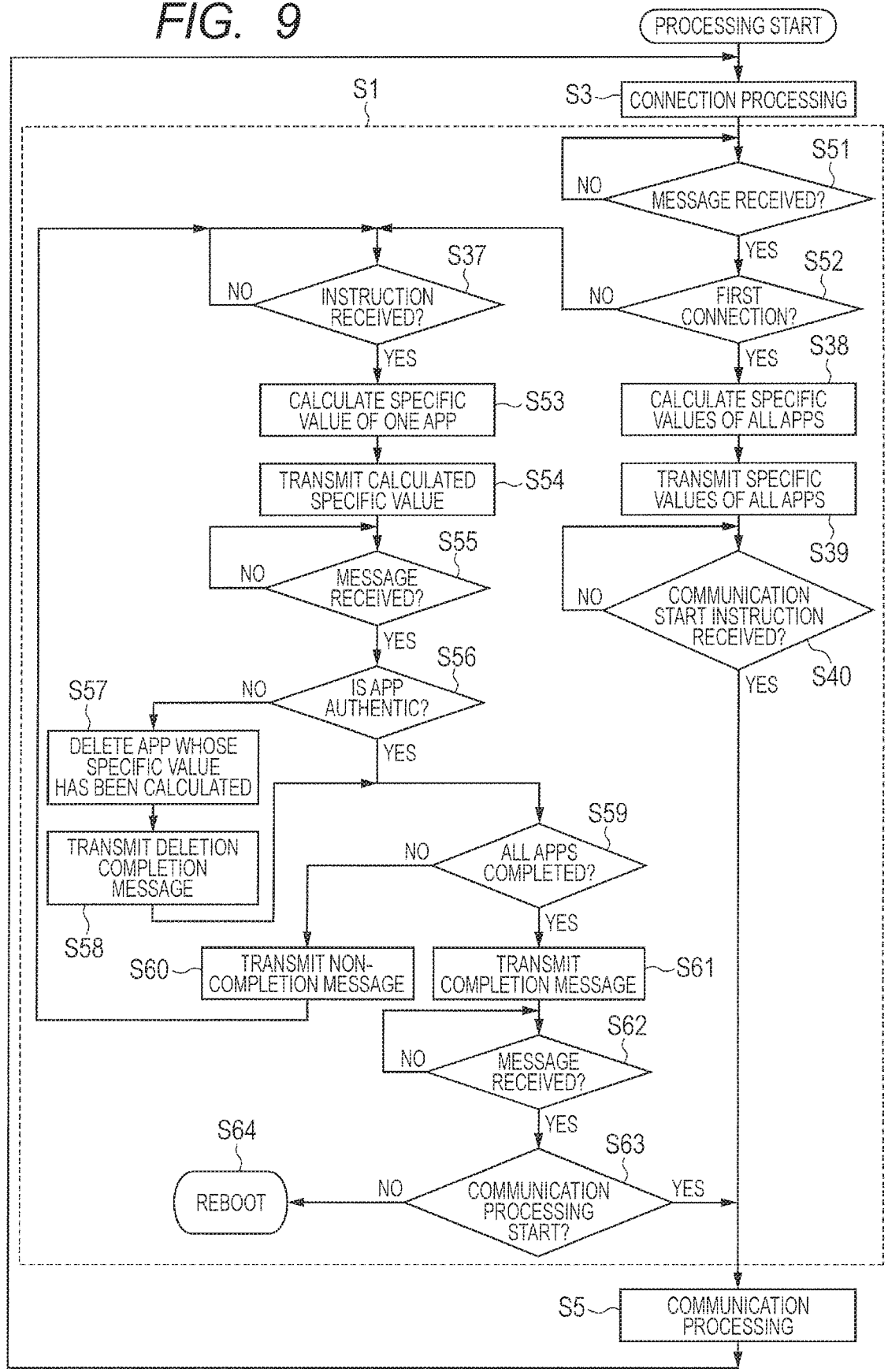
FIG. 9 is a flowchart showing an operation example of the device 1 in the case of performing deletion processing of a fraudulent app as an example of the fraudulent app detection processing according to the first embodiment.
Figure 10:
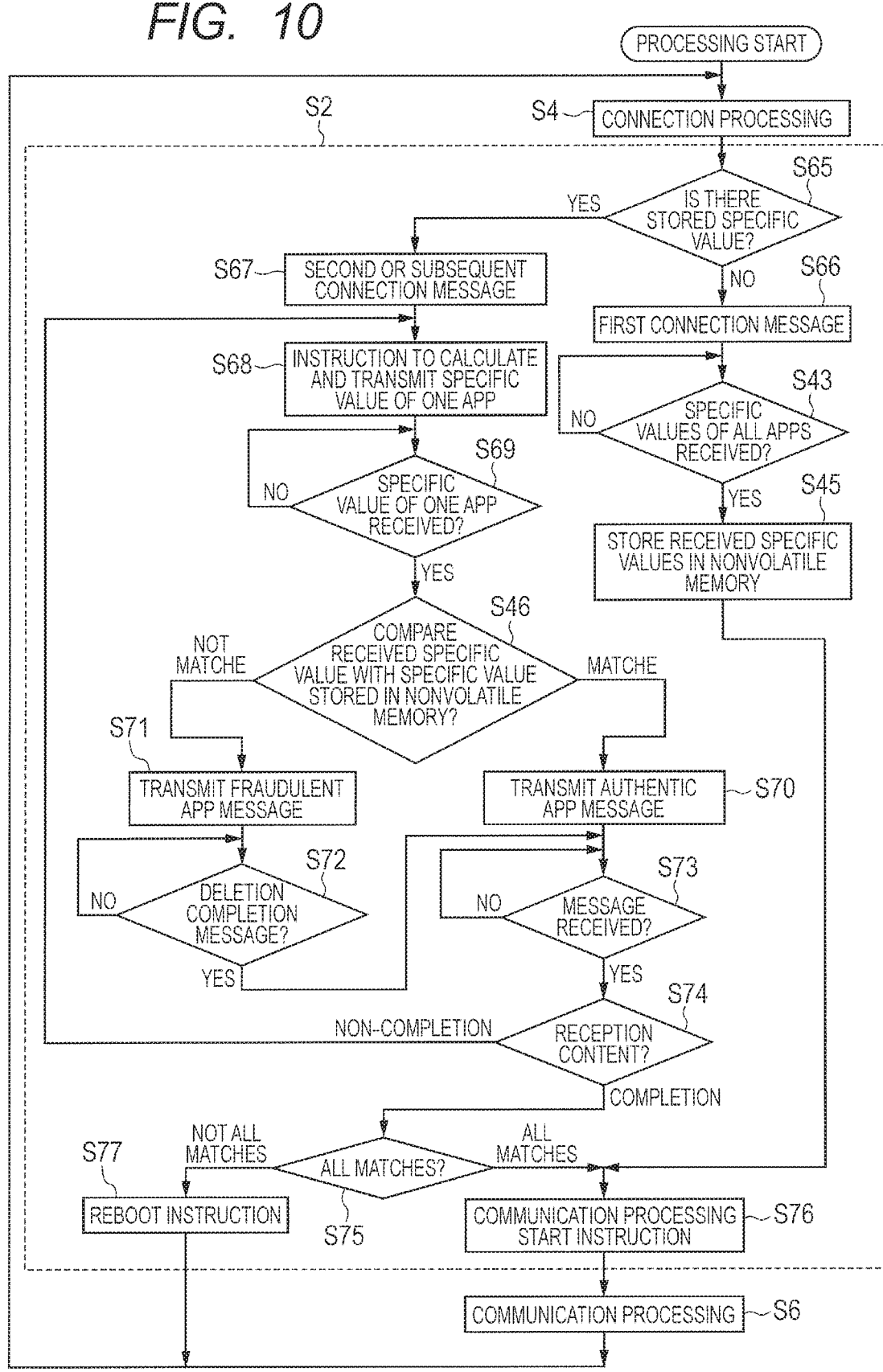
FIG. 10 is a flowchart showing an operation example of the device 10 in the case of performing deletion processing of a fraudulent app as an example of the fraudulent app detection processing according to the first embodiment.

FIGS. 9 and 10 are flowcharts showing an operation example in the case of performing the deletion processing of the fraudulent app as an example of the fraudulent app detection processing, in which FIG. 9 shows the operation of the device 1, and FIG. 10 shows the operation of the device 10.

The devices 1 and 10 performs the connection processing (S3 and S4), and then starts the fraudulent app detection processing (S1 and S2). The device 10 determines whether the connection with the device 1 is the first connection or the second or subsequent connection, based on the presence or absence of the specific value stored in the nonvolatile memory 2 (S65) (FIG. 10).

In the case of the first connection, the device 10 transmits a first connection message (S66) (FIG. 10). The device 1 waits for the reception of the message from the device 10 (S51). In the case of the first connection (S52), the device 1 calculates the specific values of all apps (S38), transmits them to the device 10 (S39), waits for the reception of the communication start instruction from the device 10 (S40), ends the fraudulent app detection processing (S1), and starts the communication processing (S5) (FIG. 9). When the device 10 receives the specific values of all apps installed on the device 1 (S43), the device 10 stores the received specific values in the nonvolatile memory 2 (S45), transmits a communication processing start instruction to the device 1 (S76), ends the fraudulent app detection processing (S2), and starts the communication processing with the device 1 (S6) (FIG. 10).

In the case of the second or subsequent connection between the devices 1 and 10, the device 10 transmits a second or subsequent connection message to the device 1 (S67), and further transmits an instruction to calculate and transmit the specific value of one app (app specific value calculation/transmission instruction) (S68) (FIG. 10). The word "one" is merely "one" that is sequentially selected in a loop for determining the validity of all apps. When the device 1 receives the app specific value calculation/transmission instruction (S37), the device 1 calculates the specific value of one app (S53), and transmits it to the device 10 (S54) (FIG. 9). When the device 10 receives the specific value of one app from the device 1 (S69), the device 10 compares the received specific value with the specific value (installation-time specific value) stored in the nonvolatile memory 2 (S46). In the case of a match, the device 10 transmits an authentic app message (S70). In the case of a mismatch, the device 10 transmits a fraudulent app message (S71) (FIG. 10). The device 1 waits for the reception of the message (S55), and determines based on the message whether the app is authentic or fraudulent (S56). If the app is fraudulent, the device 1 deletes the app whose specific value has been calculated (app subjected to validity determination) (S57), and transmits a deletion completion message to the device 10 (S58). Then, the device 1 determines whether or not the determination of the validity of all apps is completed (S59). If the determination of the validity of all apps is completed, the device 1 transmits a completion message (S61). If the determination of the validity of all apps is not completed, the device 1 transmits a non-completion message (S60) (FIG. 9). The device 10 waits for the reception of the message from the device 1 (S73). If the content indicates the non-completion of all apps (S74), the device 10 returns to the specific value calculation/transmission instruction for the next app (S68) to repeat the steps until all apps are completed (FIG. 10). When all apps are completed (S74), the device 10 determines whether or not the specific values of all apps result in all matches (S75). In the case of all matches, the device 10 transmits the communication processing start instruction to the device 1 (S76), ends the fraudulent app detection processing (S2), and starts the communication processing with the device 1 (S6). On the other hand, in the case of at least one mismatch, the device 10 transmits a reboot instruction to the device 1 (S77), and returns to the connection processing (S4) without starting the communication processing (S6) (FIG. 10). On the other hand, if the device 1 receives the communication processing start instruction (S63), the device 1 ends the fraudulent app detection processing (S1), and starts the communication processing with the device 10 (S5). If the device 1 receives the reboot instruction, the device 1 performs reboot processing (S64) (FIG. 9).

As described above, to perform the deletion processing of the fraudulent app, even the device 1 side needs to sort the processing flow, depending on whether the connection is the first connection or the second or subsequent connection, which complicates the processing details relative to the simple error processing shown in FIGS. 7 and 8; however, there is an extremely large advantage that even the device 1 of suppressed cost increase can delete the fraudulent app.

Second Embodiment

Figure 11:
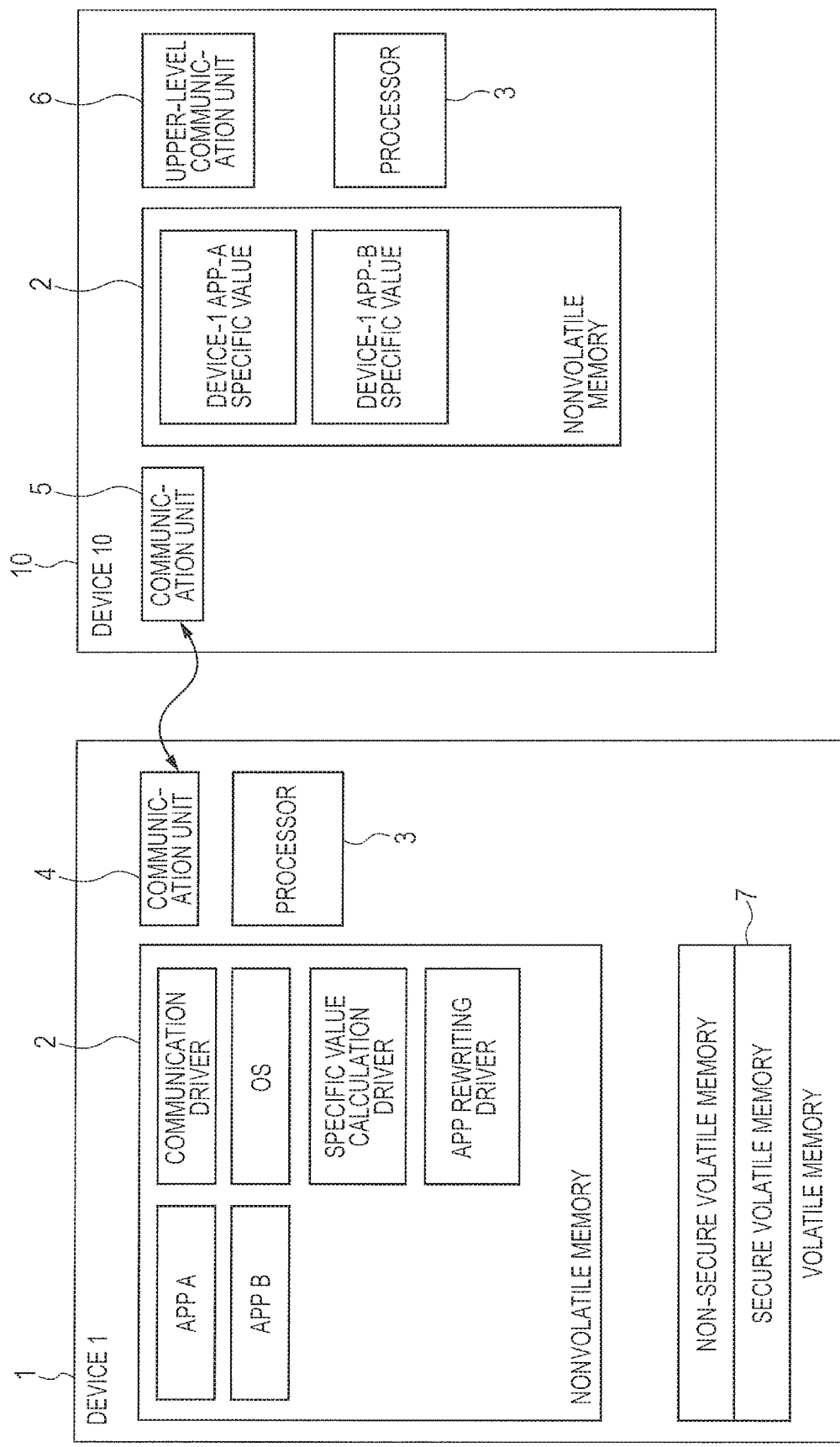
FIG. 11 is a schematic block diagram of a system including the device 1 and the device 10, according to a second embodiment.

FIG. 11 is a schematic block diagram of a system including the device 1 and the device 10, according to the second embodiment.

The device 1 is an electronic device including the nonvolatile memory 2 which is an example of a storage device where software can be installed, the processor 3 capable of executing the software, and the communication unit 4 which is an interface capable of communicating with the other device 10. The other device 10 stores specific values uniquely calculated respectively from one or a plurality of pieces of software installed on the device 1, as one or a plurality of installation-time specific values. While this configuration is the same as the configuration of the system including the device 1 and the device 10 according to the first embodiment shown in FIG. 2, the device 1 according to the second embodiment further includes a volatile memory 7 having a secure volatile memory where rewriting from application software is inhibited.

The device 1 calculates a specific value corresponding to at least one piece of installed software subjected to validity determination, as an execution-time specific value. In addition, the device 1 acquires from the device 10 an installation-time specific value corresponding to the software subjected to validity determination, and compares the installation-time specific value with the calculated execution-time specific value. In the case of a match, the device 1 determines that the software is authentic.

Thereby, the device 1 itself performs the collation between the execution-time specific value and the installation-time specific value, and can proceed to error processing or the like without outputting a collation result to the outside, which enhances resistance to external attack that falsifies the collation result.

The device 1 acquires and stores installation-time specific values of one or a plurality of pieces of installed software from the device 10 in the secure volatile memory of the volatile memory 7, and sequentially obtains and compares execution-time specific values with the corresponding installation-time specific values, thereby making it possible to determine the validity of all pieces of software whose installation-time specific values have been calculated. If it is determined that at least one is fraudulent, the device 1 proceeds to error processing, or deletes software determined to be fraudulent.

Since the other configuration shown in FIG. 11 and the basic operation are the same as in the first embodiment, the explanation is omitted.

The operations of the devices 1 and 10 will be described in more detail.

As described above, the comparison between the installation-time specific value and the execution-time specific value may be performed by the device 1, by the device 10, or by another device. In the first embodiment, the operation example in which the comparison between the installation-time specific value and the execution-time specific value is performed by the device 10 has been described; however, in the second embodiment, an operation example in which the comparison is performed by the device 1 will be described.

The operation of the app installation processing from the device 10 to the device 1 is the same as in the first embodiment described with reference to FIGS. 3 and 4. Therefore, the explanation is omitted. Further, as for the operation of the fraudulent app detection processing as well, the operation of a level described with reference to FIGS. 5 and 6 is the same as in the first embodiment. Therefore, the operation of that level will not be described.

Figure 12:
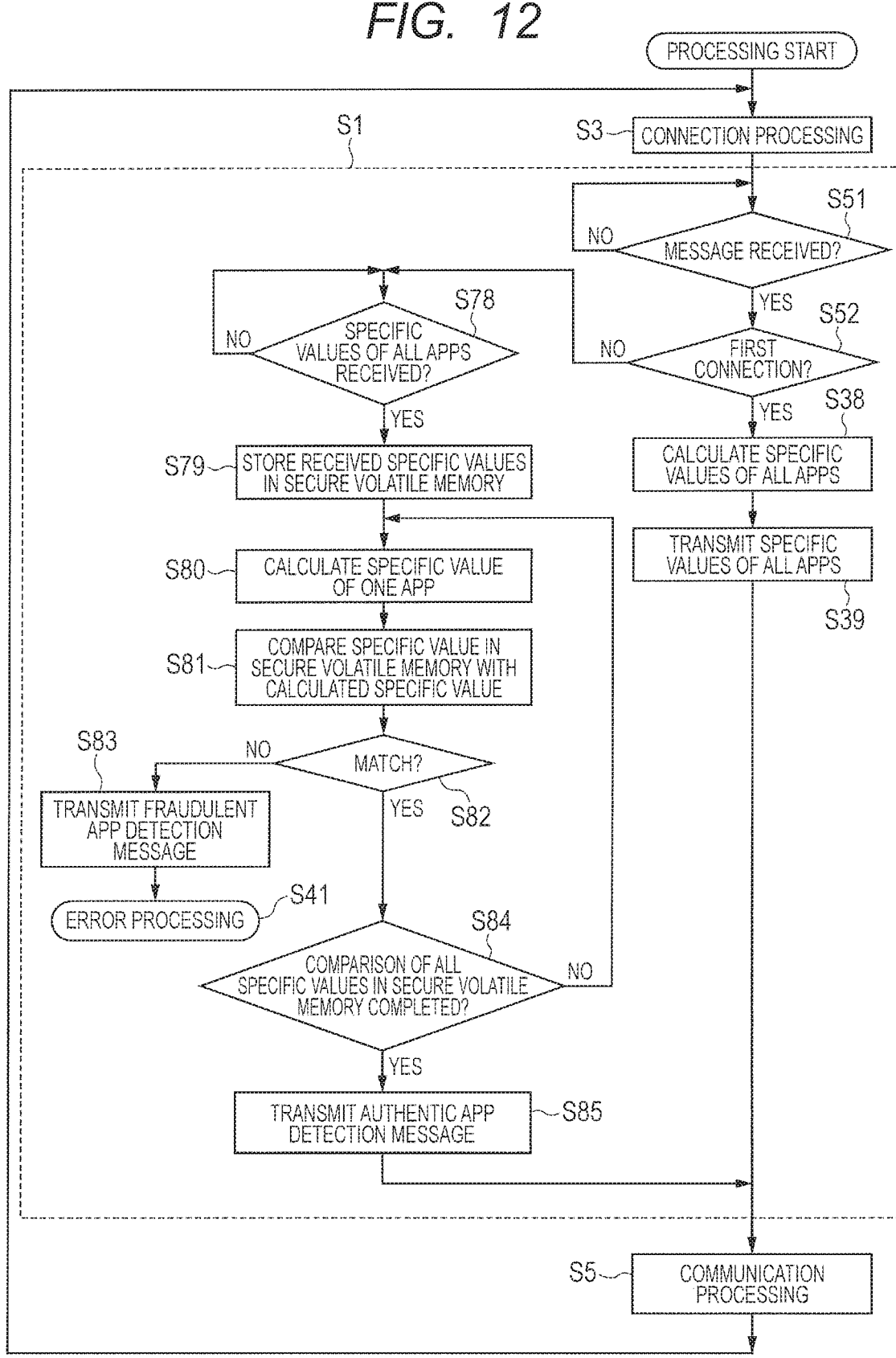
FIG. 12 is a flowchart showing an operation example of the device 1 in the case of performing error processing as an example of fraudulent app detection processing according to the second embodiment.
Figure 13:
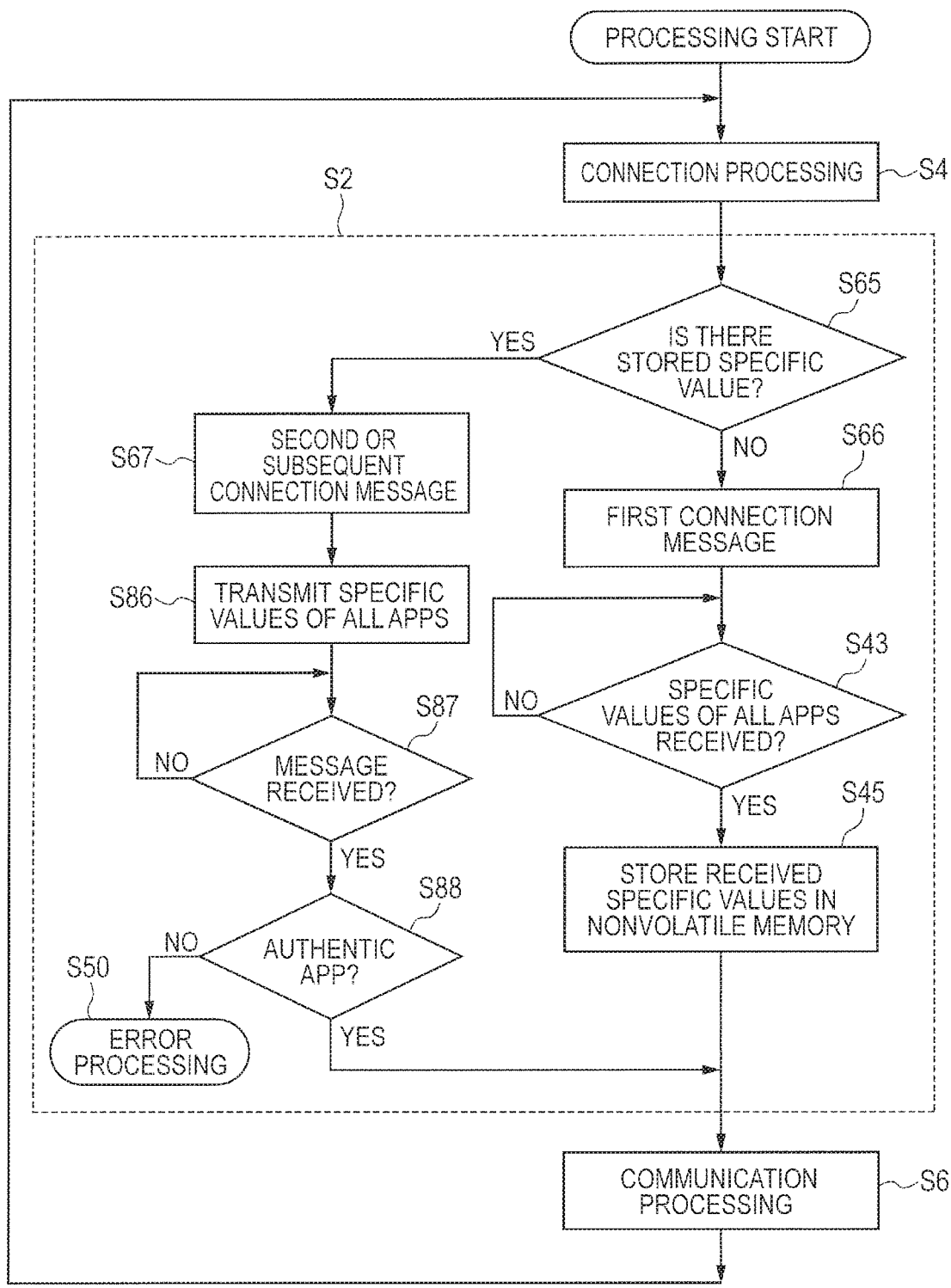
FIG. 13 is a flowchart showing an operation example of the device 10 in the case of performing error processing as an example of fraudulent app detection processing according to the second embodiment.

FIGS. 12 and 13 are flowcharts showing an operation example in the case of performing error processing as an example of the fraudulent app detection processing, in which FIG. 12 shows the operation of the device 1, and FIG. 13 shows the operation of the device 10.

The devices 1 and 10 performs the connection processing (S3 and S4), and then starts the fraudulent app detection processing (S1 and S2). The device 10 determines whether the connection with the device 1 is the first connection or the second or subsequent connection, based on the presence or absence of the specific value stored in the nonvolatile memory 2 (S65) (FIG. 13).

In the case of the first connection, the device 10 transmits a first connection message (S66) (FIG. 13). The device 1 waits for the reception of the message from the device 10 (S51). In the case of the first connection (S52), the device 1 calculates the specific values of all apps (S38), transmits them to the device 10 (S39), ends the fraudulent app detection processing (S1), and starts the communication processing (S5) (FIG. 12). When the device 10 receives the specific values of all apps installed on the device 1 (S43), the device 10 stores the received specific values in the nonvolatile memory 2 (S45), ends the fraudulent app detection processing (S2), and starts the communication processing with the device 1 (S6) (FIG. 13).

In the case of the second or subsequent connection between the devices 1 and 10, the device 10 transmits a second or subsequent connection message to the device 1 (S67), and transmits the specific values (installation-time specific values) stored in the nonvolatile memory 2 to the device 1 (S86) (FIG. 13).

When the device 1 completes the reception of the specific values of all apps (S78), the device 1 stores the received specific values in the secure volatile memory of the volatile memory 7 (S79) (FIG. 12). Then, the device 1 calculates the specific value of one app (S80). The app at this time is subjected to validity determination, and the specific value at this time is the execution-time specific value. The word "one" is merely "one" that is sequentially selected in a loop for determining the validity of all apps. The device 1 compares the calculated specific value of the app subjected to validity determination with the installation-time specific value of the app stored in the secure volatile memory of the volatile memory 7 (S81). In the case of a match, to repeat the validity determination of apps corresponding to all specific values stored in the secure volatile memory, the device 1 returns to the step (S80) of calculating the specific value of the next one app (S84). On the other hand, in the case of a mismatch, the device 1 transmits a fraudulent app detection message (S83), and performs the error processing (S41). When the validity determination of all apps is completed, the device 1 transmits an authentic app detection message (S85), ends the fraudulent app detection processing (S1), and starts the communication processing (S5) (FIG. 12).

The device 10 waits for the reception of the message from the device 1 (S87). In the case of the fraudulent app detection message (S88), the device 10 performs the error processing (S50). In the case of the authentic app detection message, the device 10 ends the fraudulent app detection processing (S2), and starts the communication processing (S6) (FIG. 13).

Next, as an example of the error processing in the case of detecting a fraudulent app, an operation example of deleting the fraudulent app will be described.

Figure 14:
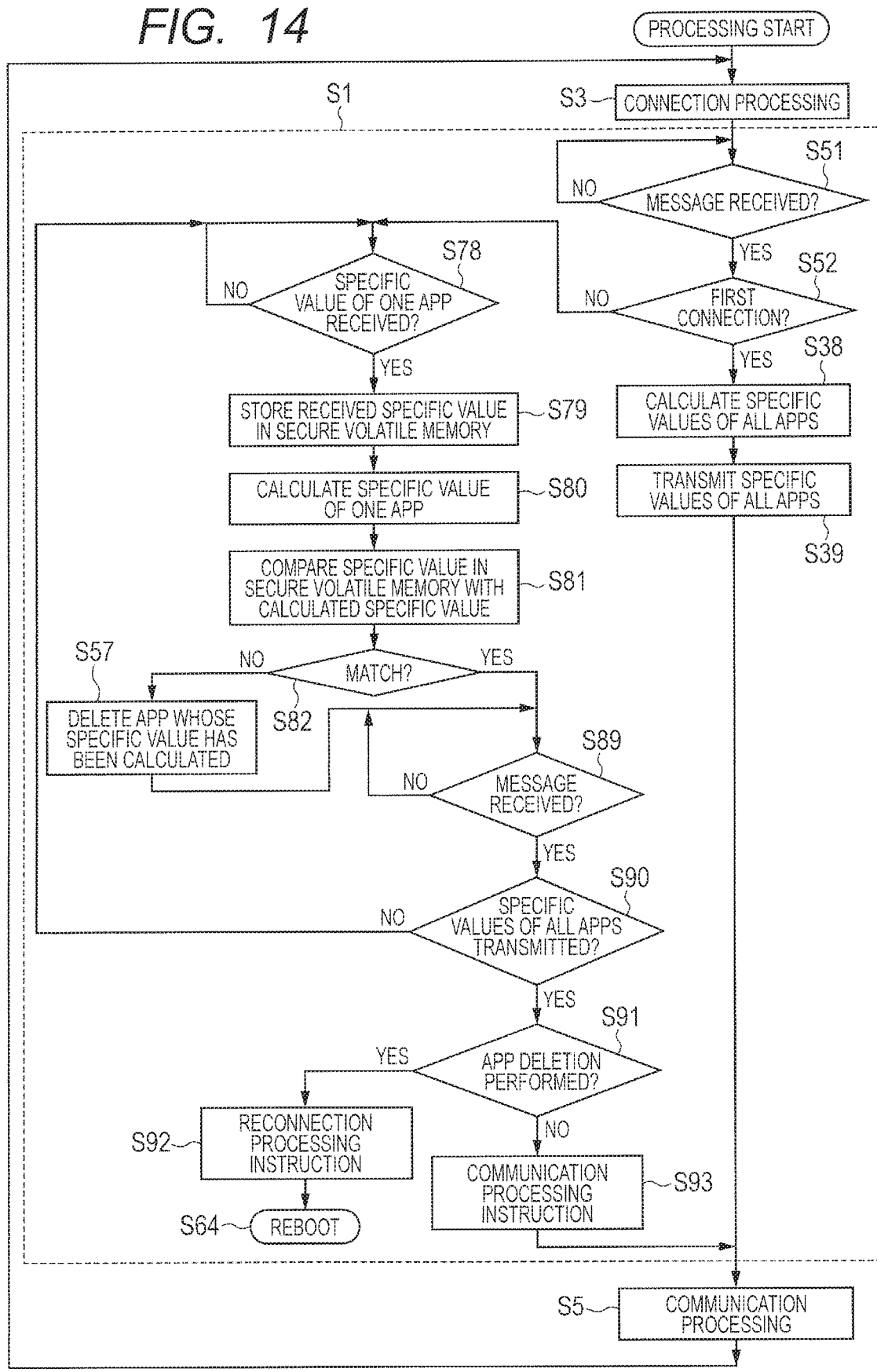
FIG. 14 is a flowchart showing an operation example of the device 1 in the case of performing deletion processing of a fraudulent app as an example of the fraudulent app detection processing according to the second embodiment.
Figure 15:
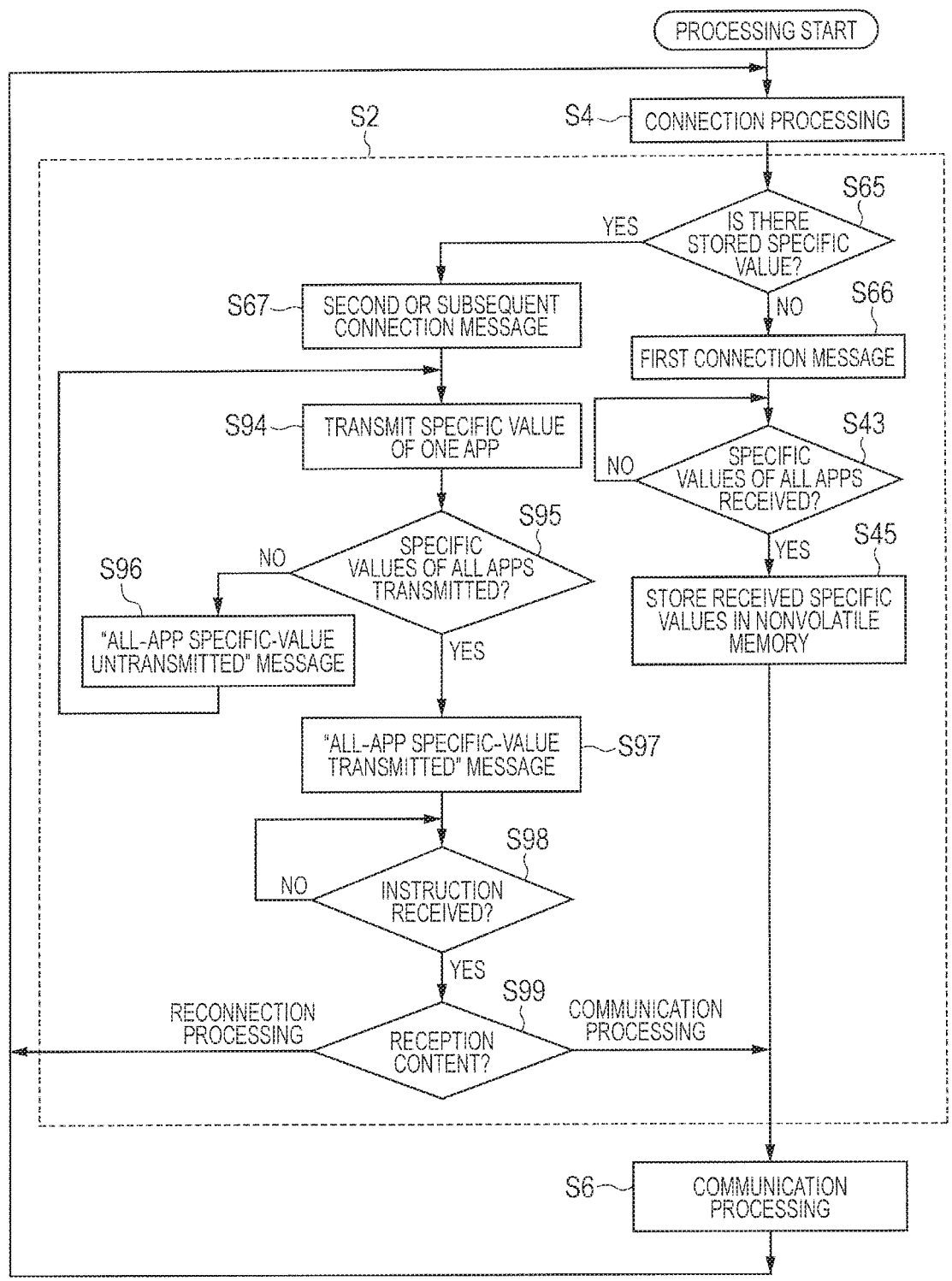
FIG. 15 is a flowchart showing an operation example of the device 10 in the case of performing deletion processing of a fraudulent app as an example of the fraudulent app detection processing according to the second embodiment.

FIGS. 14 and 15 are flowcharts showing an operation example in the case of performing the deletion processing of the fraudulent app as an example of the fraudulent app detection processing, in which FIG. 14 shows the operation of the device 1, and FIG. 15 shows the operation of the device 10.

The devices 1 and 10 performs the connection processing (S3 and S4), and then starts the fraudulent app detection processing (S1 and S2). The device 10 determines whether the connection with the device 1 is the first connection or the second or subsequent connection, based on the presence or absence of the specific value stored in the nonvolatile memory 2 (S65) (FIG. 15).

In the case of the first connection, the device 10 transmits the first connection message (S66) (FIG. 15). The device 1 waits for the reception of the message from the device 10 (S51). In the case of the first connection (S52), the device 1 calculates the specific values of all apps (S38), transmits them to the device 10 (S39), ends the fraudulent app detection processing (S1), and starts the communication processing (S5) (FIG. 14). When the device 10 receives the specific values of all apps installed on the device 1 (S43), the device 10 stores the received specific values in the nonvolatile memory 2 (S45), ends the fraudulent app detection processing (S2), and starts the communication processing with the device 1 (S6) (FIG. 15).

In the case of the second or subsequent connection between the devices 1 and 10, the device 10 transmits the second or subsequent connection message to the device 1 (S67), and reads and transmits the specific value (installation-time specific value) of one app from the nonvolatile memory 2 (S94) (FIG. 15). The word "one" is merely "one" that is sequentially selected in a loop for determining the validity of all apps. The device 10 transmits an "all-app specific-value untransmitted" message to the device 1 (S96) and repeats the step (S94) of transmitting the specific value of the next app, until the specific values of all apps stored in the nonvolatile memory 2 are transmitted (S95). When the transmission of the specific values of all apps is completed (S95), the device 10 transmits an "all-app specific-value transmitted" message to the device 1 (S97).

When the device 1 completes the reception of the specific value of one app (subjected to validity determination) (S78), the device 1 stores the received specific value in the secure volatile memory of the volatile memory 7 (S79) (FIG. 14). Then, the device 1 calculates the specific value (execution-time specific value) of the app corresponding to the received specific value (S80). The device 1 compares the calculated specific value of the app subjected to validity determination with the installation-time specific value of the app stored in the secure volatile memory of the volatile memory 7 (S81). In the case of a mismatch (S82), the device 1 deletes the app whose specific value has been calculated (app subjected to validity determination) (S57). In the case of a match, the device 1 does not delete the app. Then, the device 1 waits for the reception of the message from the device 10 (S89). The device 1 returns to the step (S78) of receiving the specific value of the next app, until the received message becomes the "all-app specific-value transmitted" message (S90), and repeats validity determination. When the received message becomes the "all-app specific-value transmitted" message (S90), the device 1 determines whether or not the device 1 has performed app deletion (S91). If the deletion has been performed, the device 1 transmits a reconnection processing instruction to the device 10 (S92), and performs reboot (S64). On the other hand, if a fraudulent app is not detected and the app deletion has not been performed, the device 1 transmits the communication processing start instruction to the device 10 (S93), ends the fraudulent app detection processing (S1), and starts the communication processing (S5) (FIG. 14).

The device 10 waits for the reception of the message from the device 1 (S98). If the content indicates the "reconnection processing", the device 10 returns to the connection processing (S4). In the case of the "communication processing", the device 10 ends the fraudulent app detection processing (S2), and starts the communication processing with the device 1 (S6) (FIG. 15).

As described above, in the second embodiment, the device 1 itself performs the collation between the execution-time specific value and the installation-time specific value, and can proceed to the error processing or the like without outputting a collation result to the outside, which enhances resistance to external attack that falsifies the collation result. In the operation example described with reference to FIGS. 14 and 15, as in FIGS. 9 and 10 in the first embodiment, there is an extremely large advantage that even the device 1 of suppressed cost increase can delete the fraudulent app.

Third Embodiment

Figure 16:
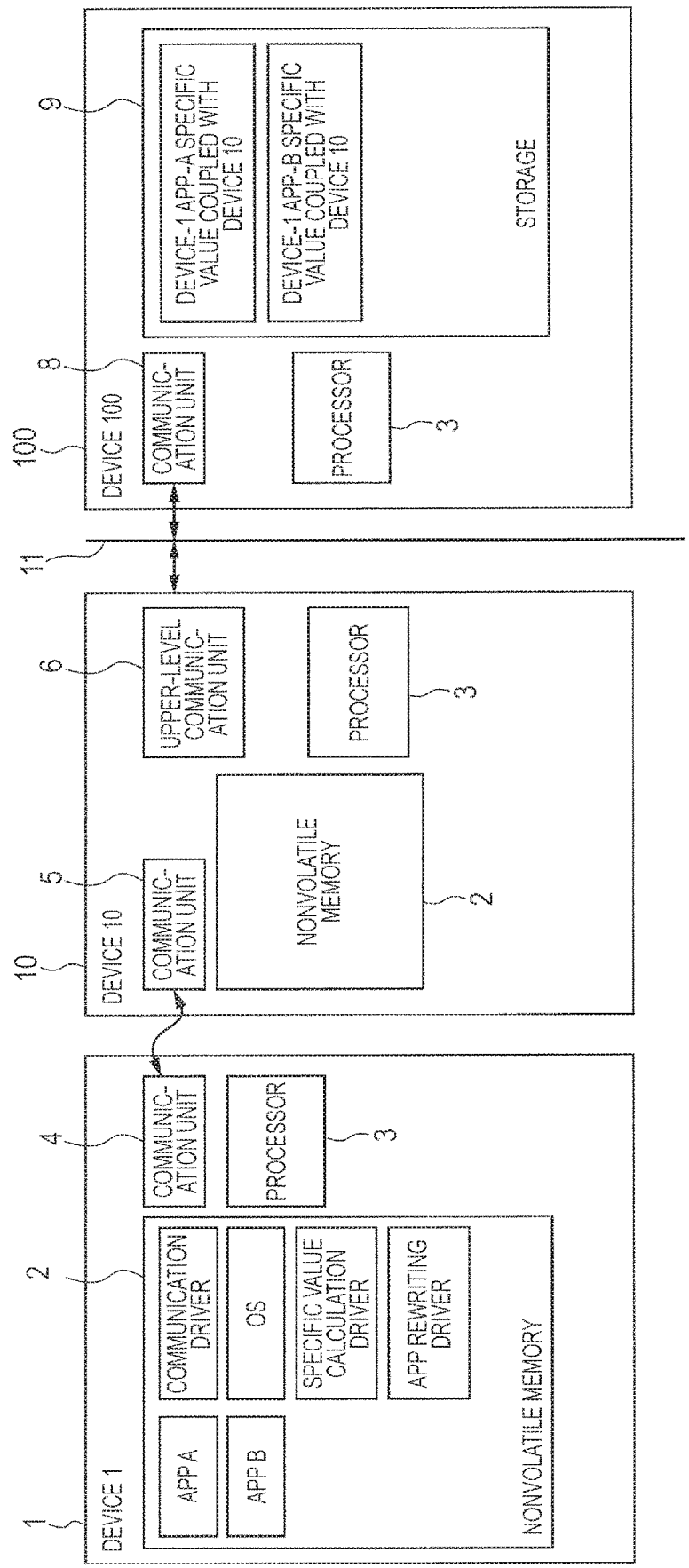
FIG. 16 is a schematic block diagram of a system including the device 1, the device 10, and a device 100, according to a third embodiment.

FIG. 16 is a schematic block diagram of a system including the device 1, the device 10, and a device 100, according to the third embodiment.

While the system including the device 1 and the device 10 has been described in the first and second embodiments, a mode in which the device 100 is further connected to the device 10 through a network 11 will be described in the third embodiment.

In the first embodiment, description has been made with reference to FIG. 2 as follows. "The device 1 is an electronic device including the nonvolatile memory 2 which is an example of a storage device where software can be installed, the processor 3 capable of executing the software, and the communication unit 4 which is an interface capable of communicating with the other device 10, and is, for example, an activity meter or a dashcam. The other device 10 stores specific values uniquely calculated respectively from one or a plurality of pieces of software installed on the device 1, as one or a plurality of installation-time specific values." In this context, "the other device" is not necessarily limited to the device 10 which can directly communicate with the device 1, and may be a device that performs communication through a relay device.

The third embodiment is an example thereof in which "the other device" is the device 100. That is, the device 1 is an electronic device including the nonvolatile memory 2 which is an example of a storage device where software can be installed, the processor 3 capable of executing the software, and the communication unit 4 which is an interface capable of communicating with the other device 100, and is, for example, an activity meter or a dashcam. The other device 100 stores specific values uniquely calculated respectively from one or a plurality of pieces of software installed on the device 1, as one or a plurality of installation-time specific values. The device 1 calculates a specific value corresponding to at least one piece of installed software subjected to validity determination, as an execution-time specific value. The installation-time specific value and execution-time specific value of the software subjected to validity determination are compared. In the case of a match, it is determined that the software is authentic. The comparison between the installation-time specific value and the execution-time specific value may be performed by the device 1, by the device 100, or any other device.

Even in the mode in which the device 1 communicate with the device 100 through the device 10 as in the third embodiment, it is also possible to provide the same effect as the first embodiment in which even if the device 1 itself does not have an advanced security function such as the secure boot, it is possible to determine the validity of software in conjunction with the reliable external device 10.

Further detailed description will be made with reference to FIG. 16. The configuration of the device 1 is the same as in FIG. 2, and therefore will not be described. The configuration of the device 10 is also the same as in FIG. 2; however, the nonvolatile memory 2 does not need to store the installation-time specific value. The device 100 includes a communication unit 8, a processor 3, and a storage 9 such as a hard disk drive (HDD). The device 100 is connected so as to be able to communicate with the device 10 through a network 11 such as Ethernet, and the communication unit 8 is an interface with the network 11. The device 100 is, for example, a server provided on the Internet by the manufacturer or the like of the device 1. The device 100 provides apps operating on the device 1, or causes a trusted third party to provide them. For example, the device 1 is an activity meter, the device 10 is a smartphone, and the user of the device 1 (activity meter) is also the user of the device 10 (smartphone). The apps of the device 1 are downloaded from the manufacturer server of the device 1 as an example of the device 100 through the Internet as an example of the network 11, and installed on the device 1. In this embodiment, the device 100 is reliable, and the apps installed from the device 100 onto the device 1 are guaranteed to be authentic. The device 100 stores the installation-time specific values of the apps installed on the device 1 in the storage 9. Assuming that the device 100 is a server that supports multiple users, the situation of the purchase/non-purchase of the app might differ among users. Therefore, it is preferable that the installation-time specific values of the apps are stored in the storage 9 in association with information that the apps are installed by the device 10 onto the device 1, as shown by a device-1 app-A specific value connected with the device 10 and a device-1 app-B specific value connected with the device 10 in FIG. 16. This is because it is possible to expand the determination target to validity in terms of contract such as purchase/non-purchase in addition to validity depending on the distribution source.

Figure 17:
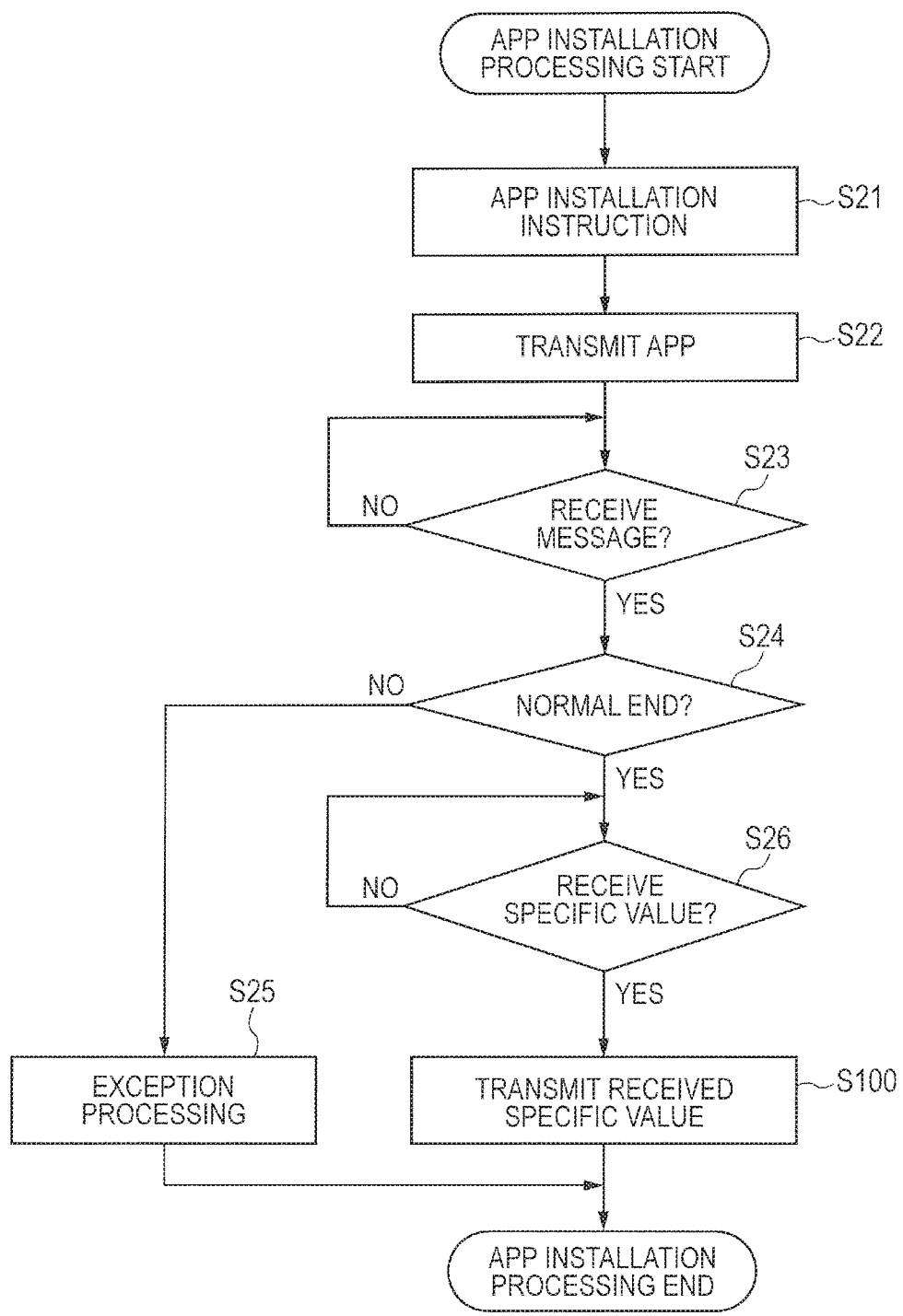
FIG. 17 is a flowchart showing an operation example of the device 10 of app installation processing according to the third embodiment.
Figure 18:
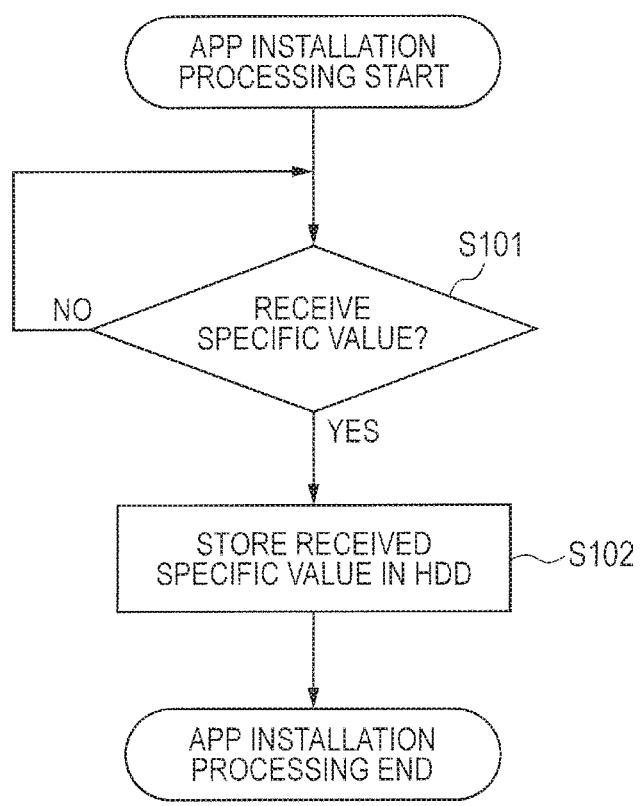
FIG. 18 is a flowchart showing an operation example of the device 100 of app installation processing according to the third embodiment.

Processing in which the device 10 installs a new app onto the device 1 will be described with reference to FIGS. 3, 17, and 18. FIGS. 3, 17, and 18 are flowcharts showing an operation example of app installation processing from the device 10 to the device 1, in which FIG. 3 shows the operation of the device 1, FIG. 17 shows the operation of the device 10, and FIG. 18 shows the operation of the device 100. FIG. 3 is cited in the first embodiment as well, and the operation of the app installation processing of the device 1 is the same as in the first and second embodiments.

As a premise, the device 10 downloads a new authentic app from the device 100 and stores it in the nonvolatile memory 2 in the device 10 (not shown in FIG. 16), and the devices 1 and 10 and the devices 10 and 100 perform connection processing beforehand through the communication units 4 and 5 and the communication units 6 and 8 respectively, and are in a communicable state.

The devices 1, 10, and 100 start the app installation processing. The device 10 transmits an app installation instruction to the device 1 (S21), and then transmits a new app (S22) (FIG. 17). When the device 1 receives the app installation instruction from the device 10 (S11), and then receives the new app (S12), the device 1 installs the received new app, using the app rewriting driver (S13) (FIG. 3). If the installation is normally ended, the device 1 transmits a normal end message to the device 10 (S17), calculates an installation-time specific value corresponding to the new app installed on the device 1 (S18), transmits the value (S19), and reboots the device 1 (S20) (FIG. 3). On the other hand, if the installation is abnormally ended, the device 1 transmits an abnormal end message to the device 10 (S15), performs exception processing (S16), and ends the app installation processing (FIG. 3). If the device 10 receives the normal end message from the device 1 (S23, S24), the device 10 receives the installation-time specific value corresponding to the new app (S26), transmits the received installation-time specific value to the device 100 (S100), and ends the app installation processing (FIG. 17). On the other hand, if the device 10 receives the abnormal end message, the device 10 performs exception processing (S25), and ends the app installation processing (FIG. 17). The device 100 waits for the specific value from the device 10 (S101), stores the received specific value in the storage 9 (S102), and ends the app installation processing (FIG. 18).

Next, fraudulent app detection processing will be described with reference to FIGS. 7, 19, and 20. Since the operation of a level described with reference to FIGS. 5 and 6 is the same as in the first and second embodiments, the operation of that level will not be described.

Figure 19:
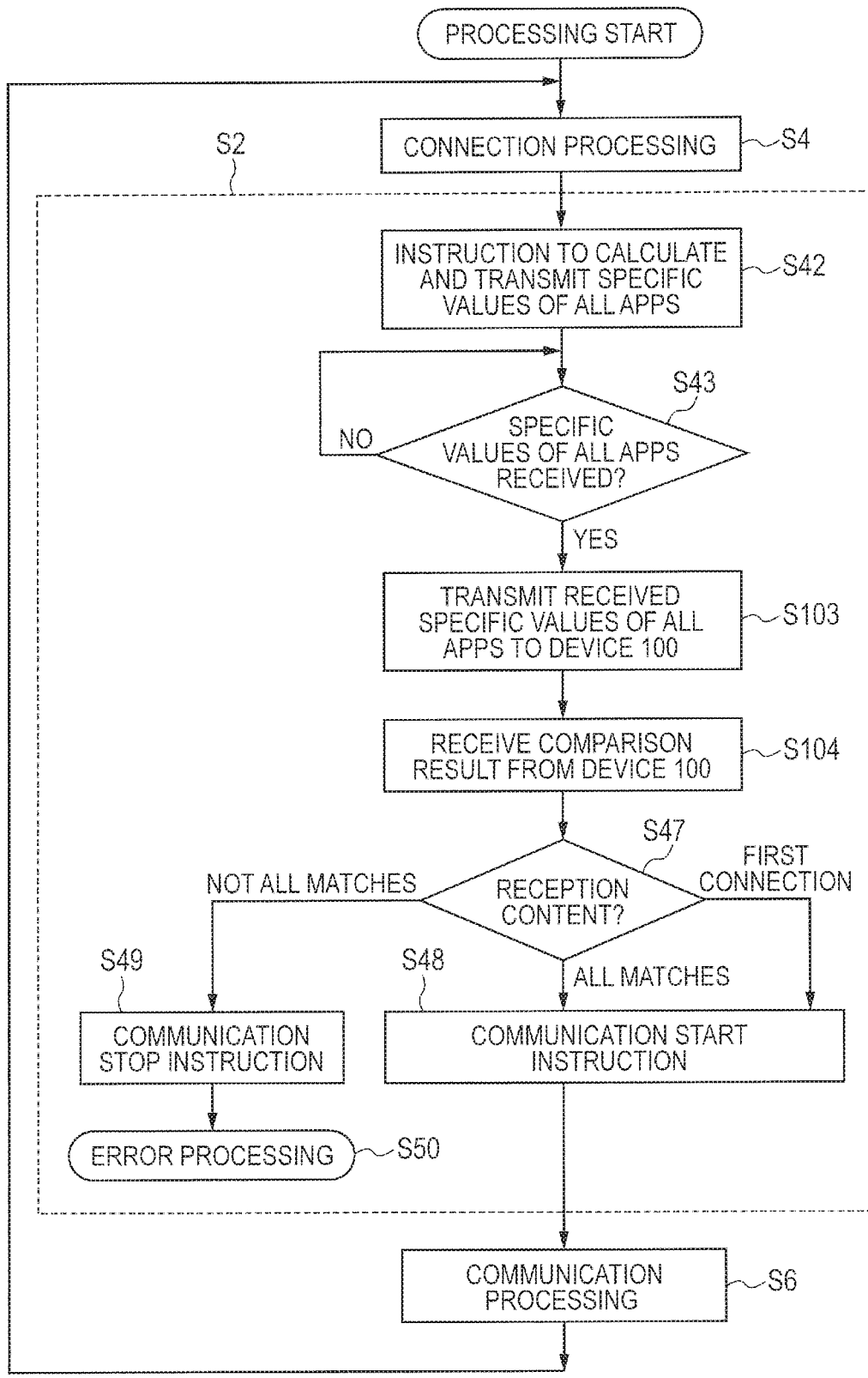
FIG. 19 is a flowchart showing an operation example of the device 10 in the case of performing error processing as an example of fraudulent app detection processing according to the third embodiment.
Figure 20:
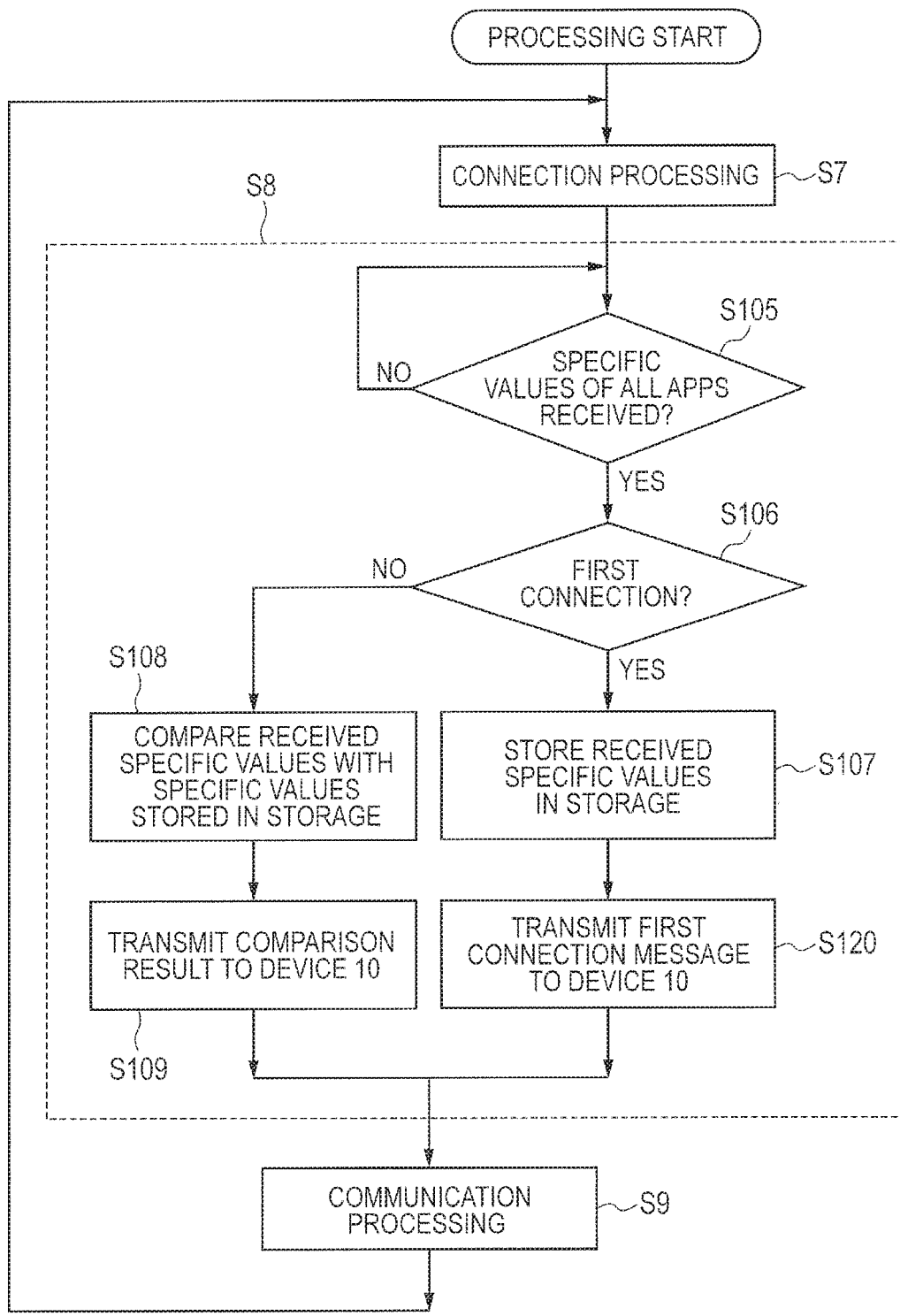
FIG. 20 is a flowchart showing an operation example of the device 100 in the case of performing error processing as an example of fraudulent app detection processing according to the third embodiment.

FIGS. 7, 19, and 20 are flowcharts showing an operation example in the case of performing error processing as an example of the fraudulent app detection processing, in which FIG. 7 shows the operation of the device 1, FIG. 19 shows the operation of the device 10, and FIG. 20 shows the operation of the device 100. FIG. 7 is also cited in the first embodiment, and the operation of the fraudulent app detection processing of the device 1 is the same as in the first and second embodiments.

The devices 1, 10, and 100 performs the connection processing (S3, S4, and S7), and then starts the fraudulent app detection processing (S1, S2, and S8). The device 10 transmits an app specific value calculation/transmission instruction to the device 1 (S42) (FIG. 19). When the device 1 receives the instruction (S37), the device 1 calculates the specific values of all apps stored in the nonvolatile memory 2 by the specific value calculation driver (S38), and transmits them to the device 10 (S39) (FIG. 7). When the device 10 receives the specific values of all apps installed on the device 1 (S43), the device 10 transmits the received specific values of all apps to the device 100 (S103) (FIG. 19).

When the device 100 receives the specific values of all apps installed on the device 1 (S105), the device 100 determines whether or not the connection with the device 1 is the first connection (S106) (FIG. 20). In the case of the first connection, the device 100 stores the received specific values in the storage 9 (S107), and transmits a first connection message to the device 10 (S120). In the case of the second or subsequent connection, the device 100 compares the received specific values with specific values stored in the storage 9 (S108). When the device 100 receives the specific values of all apps installed on the device 1 in S105, the device 100 cannot determine whether the specific values are installation-time specific values or execution-time specific values; therefore, the device 100 makes the determination based on whether the connection with the device 1 is the first connection or the second or subsequent connection. In the case of the first connection, the device 100 regards the received specific values as installation-time specific values, and stores them in the storage 9. In the case of the second or subsequent connection, the device 100 regards the received specific values as execution-time specific values, and compares them with installation-time specific values stored in the storage 9.

The device 100 transmits a comparison result or the first connection message to the device 10 (S109, S120), ends the fraudulent app detection processing (S8), and starts communication processing (S9) (FIG. 20). As the result of the comparison in S108, the device 100 can determine whether or not a fraudulent app is included in the apps installed on the device 1, but may continue the communication processing with the device 10. It is possible to perform error processing such as the deletion of the fraudulent app by control from the device 10 to the device 1. On the other hand, after determining that the fraudulent app is detected and transmitting the result to the device 10 (S109), the device 100 may cut off the communication with the device 10 without starting the communication processing (S9). It is possible to arbitrarily determine a security policy as to what measure to take.

The device 10 receives the comparison result or the first connection message from the device 100 (S104) (FIG. 19). In the case of all matches as the comparison result or the first connection (S47), the device 10 transmits a communication start instruction to the device 1 (S48), ends the fraudulent app detection processing (S2), and starts the communication processing (S6). If the comparison result does not indicate all matches, the device 10 transmits a communication stop instruction to the device 1 (S49), performs the error processing (S50), and then ends the fraudulent app detection processing.

If the device 1 receives the communication start instruction from the device 10 (S40), the device 1 ends the fraudulent app detection processing (S1), and starts the communication processing (S5). On the other hand, in the case of the communication stop instruction, the device 1 performs the error processing (S41), and then ends the fraudulent app detection processing (FIG. 7).

The specific values calculated by the device 1 in the case of the second or subsequent connection between the devices 1 and 100 are execution-time specific values; however, the device 1 does not manage whether the connection is the first connection or the second or subsequent connection, and therefore does not distinguish between the installation-time specific value and the execution-time specific value. The collation between the execution-time specific value and the installation-time specific value is performed by the device 100, which can minimize an amount of computation on the device 1.

The device 100 stores the installation-time specific values in the storage 9 (S107), in association with the device 1 where the apps are installed and the device 10 which has installed the apps. At the time of the comparison (S108), the specific values associated with both the devices are compared. Thereby, in the case where another user uses the same device 1, using another device 10, it is possible to determine the validity of the app for each user. Therefore, it is possible to expand and determine the validity of the app, based not only on whether or not the distribution source of the app is authentic but also on whether or not the app is duly acquired.

Fourth Embodiment

In the third embodiment as well as in the first and second embodiments, only one device can behave as a trusted device. That is, in FIG. 11, the device 10 is a trusted device; therefore, an app other than the apps installed by the device 10, which is an authentic app from the same distribution source but is installed by a different device, is treated as a fraudulent app. On the other hand, the association as in the third embodiment is not performed, and simplification may be made so as to determine the validity of the app, limited simply to the validity of the distribution source. This eliminates the need for user management by the device 100, which reduces a task on the device 100.

Figure 21:
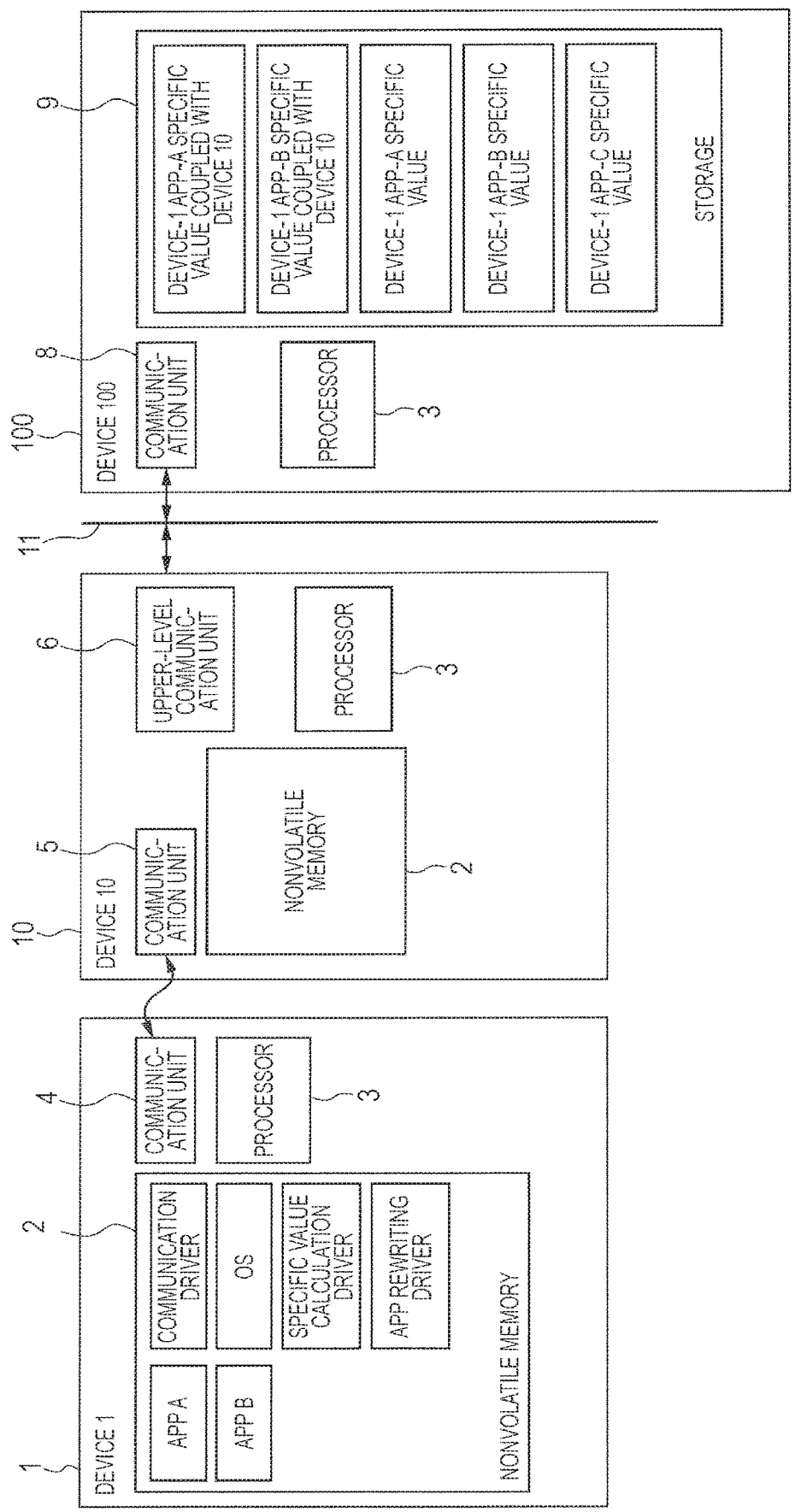
FIG. 21 is a schematic block diagram of a system including the device 1, the device 10, and the device 100, according to a fourth embodiment.

FIG. 21 is a schematic block diagram of a system including the device 1, the device 10, and the device 100, according to the fourth embodiment. The configuration is the same as in FIG. 16, and therefore will not be described. All the specific values of the apps A, B, and C provided for the device 1 are stored in the storage 9 such as HDD of the device 100. Assume that only the app A and the app B have already been installed on the device 1, but the app C has not yet been installed thereon.

A specific example is as follows. That is, the device 100 is the manufacturer of the device 1 (e.g., activity meter), and sells the device 1 with the app A and the app B pre-installed. The manufacturer of the device 1 also provides the app C for the device 1, but the app C is not yet installed on the device 1 at this stage. The user who has purchased the device 1 connects the device 1 to the device 10 (e.g., smartphone) owned by the user, and further to the device 100 which is the server of the manufacturer, through the network 11 (e.g., the Internet). Then, the app C is newly downloaded and installed on the device 1.

Figure 22:
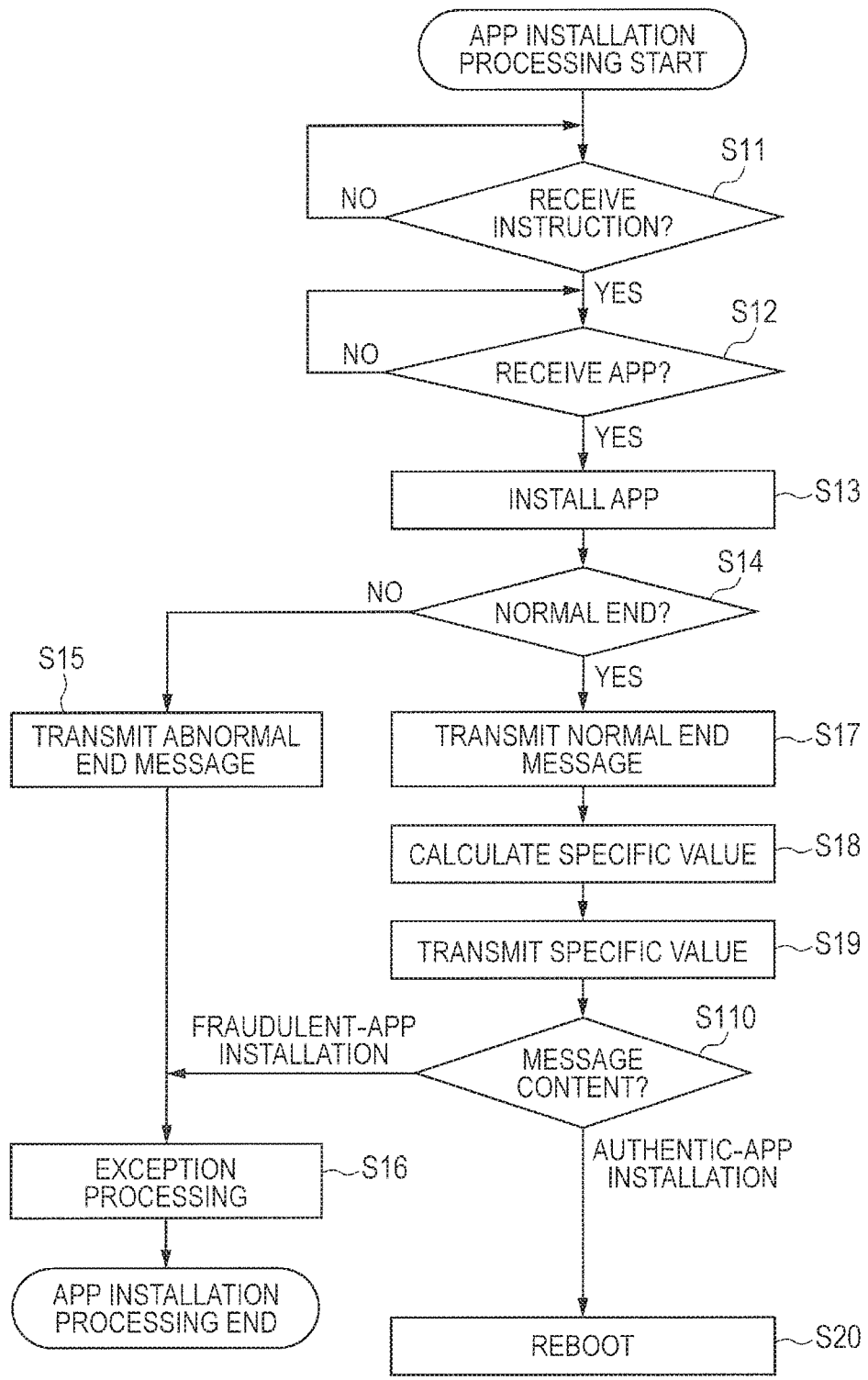
FIG. 22 is a flowchart showing an operation example of the device 1 of app installation processing according to the fourth embodiment.
Figure 23:
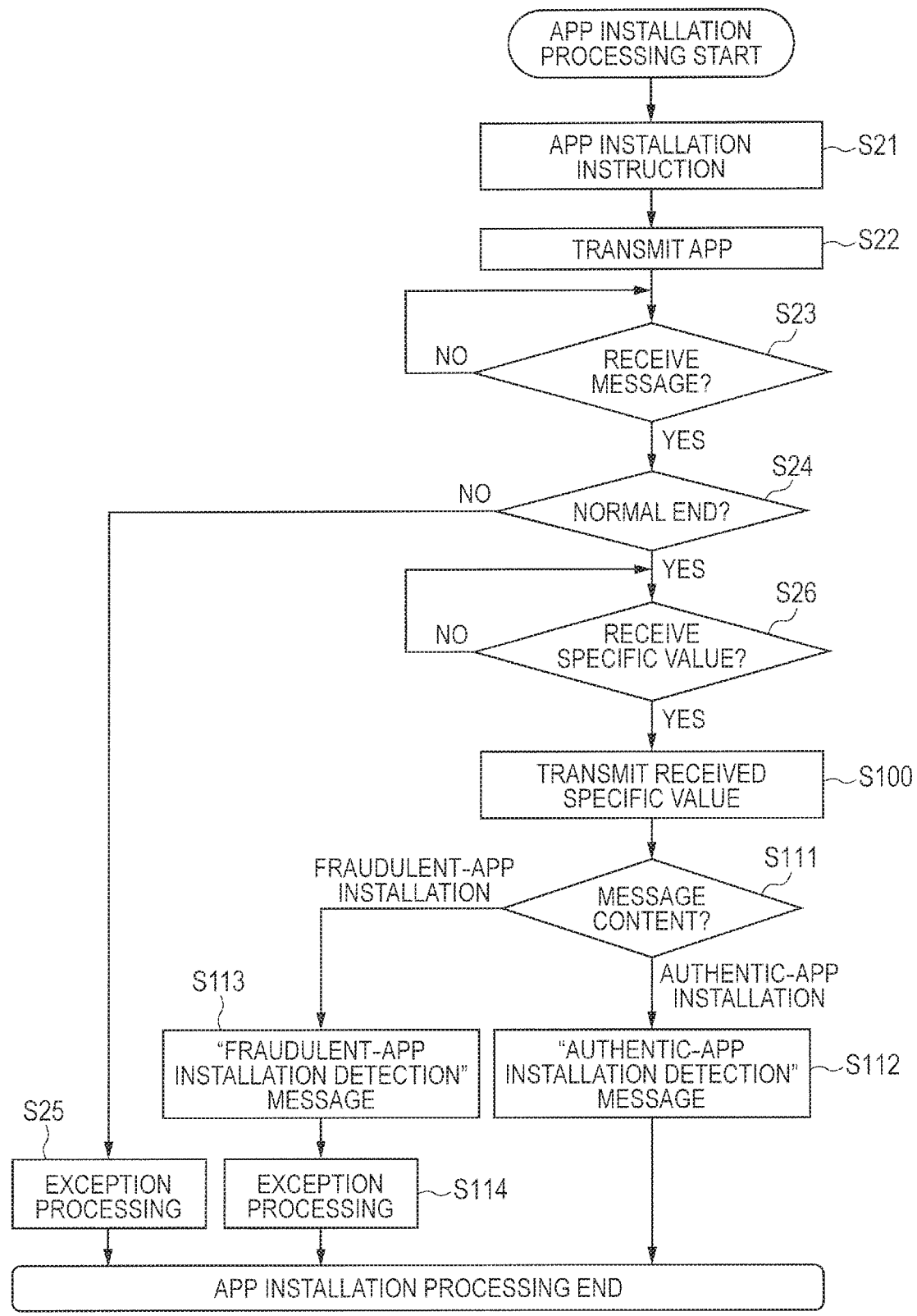
FIG. 23 is a flowchart showing an operation example of the device 10 of app installation processing according to the fourth embodiment.

Processing in which the device 10 installs the new app C onto the device 1 will be described with reference to FIGS. 22 to 24. FIGS. 22 to 24 are flowcharts showing an operation example of app installation processing from the device 10 to the device 1, in which FIG. 22 shows the operation of the device 1, FIG. 23 shows the operation of the device 10, and FIG. 24 shows the operation of the device 100.

As a premise, the device 10 downloads the new authentic app C from the device 100 and stores it in the nonvolatile memory 2 in the device 10 (not shown in FIG. 21), the devices 1 and 10 and the devices 10 and 100 perform connection processing beforehand through the communication units 4 and 5 and the communication units 6 and 8 respectively, and are in a communicable state.

The devices 1, 10, and 100 start the app installation processing. The device 10 transmits an app installation instruction to the device 1 (S21), and then transmits the new app C to the device 1 (S22) (FIG. 23). When the device 1 receives the app installation instruction from the device 10 (S11), and then receives the new app C (S12), the device 1 installs the app C, using the app rewriting driver (S13) (FIG. 22). If the installation is normally ended, the device 1 transmits a normal end message to the device 10 (S17), calculates an installation-time specific value corresponding to the new app C installed on the device 1 (S18), and transmits the value (S19). On the other hand, if the installation is abnormally ended, the device 1 transmits an abnormal end message to the device 10 (S15), performs exception processing (S16), and ends the app installation processing.

If the device 10 receives the normal end message from the device 1 (S23, S24), the device 10 receives the installation-time specific value corresponding to the new app (S26), and transmits the received installation-time specific value to the device 100 (S100) (FIG. 23). On the other hand, if the device 10 receives the abnormal end message, the device 10 performs exception processing (S25), and ends the app installation processing.

The device 100 waits for the specific value from the device 10 (S101), and compares the received specific value with a device-1 app-C specific value stored in the storage 9 (S115). In the case of a match, the device 100 transmits an "authentic-app installation detection" message to the device 10 (S119). In the case of a mismatch, the device 100 transmits a "fraudulent-app installation detection" message to the device 10 (S117). Then, the device 100 ends the app installation processing (FIG. 24). In the case of the match, the device 100 may associate the received specific value with the device 10, and store it as a "device-1 app-C specific value connected with the device 10" in the storage 9 (S118). This enables the fraudulent app detection processing shown in the third embodiment. On the other hand, in the case where the fraudulent app detection processing in consideration of the association with the device 10 is not performed, S118 may be omitted.

If the content of the message received from the device 100 indicates "authentic-app installation", the device 10 transmits an "authentic-app installation detection" message to the device 1 (S112), and ends the app installation processing (FIG. 23). On the other hand, if the content of the message indicates "fraudulent-app installation", the device 10 transmits a "fraudulent-app installation detection" message to the device 1 (S113), performs exception processing (S114), and then ends the app installation processing.

If the content of the message received from the device 10 (S110) indicates "authentic-app installation", the device 1 reboots the device 1 (S20). If the content of the message indicates "fraudulent-app installation", the device 1 performs the exception processing (S16), and ends the app installation processing (FIG. 22).

While the invention made above by the present inventors has been described specifically based on the illustrated embodiments, the present invention is not limited thereto. It is needless to say that various changes and modifications can be made thereto without departing from the spirit and scope of the invention.

For example, the invention can be applied to a mode according to an in-vehicle network of an automobile. In this case, the terminal device illustrated as the device 1 is a device for controlling various sensors connected to the terminal of the in-vehicle network, the intermediate device illustrated as the device 10 is an electronic control unit such as a car navigation device or an automatic driving device provided in the in-vehicle network, and the upper-level device illustrated as the device 100 is an external information server or the like connected to the in-vehicle network. In a mode according to an automatic traffic system, the terminal device illustrated as the device 1 is a device for controlling various sensors for collecting road information or a display device for displaying traffic information etc., the intermediate device illustrated as the device 10 is a roadside machine, and the upper-level device illustrated as the device 100 is an information server or the like for managing the automatic traffic system. Further, in a mode according to a network (IoT) configuring other control devices and monitoring devices, the terminal device illustrated as the device 1 may be a device for controlling various sensors or actuators.

What is claimed is:

1. An electronic device, comprising:
 a storage device where software is configured to be installed;
 a processor capable of executing the software; and
 an interface capable of communicating with an other device,
 wherein the other device stores specific values uniquely calculated respectively from one or a plurality of pieces of software installed on the electronic device, as one or a plurality of installation-time specific values,
 wherein the electronic device calculates a specific value corresponding to one piece of installed software, as an execution-time specific value,
 wherein the electronic device determines validity of the one piece of software, based on a collation result which includes a result of determining whether the execution-time specific value matches one or none of the one or plurality of installation-time specific values, by causing the other device to compare the execution-time specific value with the one or plurality of installation-time specific values stored in the other device,
 wherein the electronic device transmits the execution-time specific value to the other device,
 wherein the other device compares a received execution-time specific value with the one or plurality of installation-time specific values, and transmits the collation results to the electronic device, and
 wherein the specific value is irreversible and uniquely determined by inputting an execution instruction code of the software.

2. The electronic device according to claim 1, wherein, if the collation result indicates no match, the electronic device executes error processing.

3. The electronic device according to claim 1, wherein, if the collation result indicates no match, the electronic device deletes the one piece of software.

4. The electronic device according to claim 1, wherein, when new software is installed on the electronic device, the electronic device transmits a specific value uniquely calculated from the new software, as an installation-time specific value corresponding to the new software, and
 wherein, when the other device receives the installation-time specific value corresponding to the new software, the other device stores the installation-time specific value in addition to one or a plurality of other installation-time specific values.

5. The electronic device according to claim 1, wherein the other device is located outside the electronic device.

6. The electronic device according to claim 1, wherein, when the collation results indicate a match between the received execution-time specific value with the one or plurality of installation-time specific values, the electronic device determines that the software is authentic.

7. An electronic device capable of communicating with a terminal device where software is installed and executed,
 wherein the electronic device stores specific values uniquely calculated respectively from one or a plurality of pieces of software installed on the terminal device, as one or a plurality of installation-time specific values, and causes the terminal device to calculate a specific value corresponding to at least one piece of installed software, as an execution-time specific value,
 wherein the electronic device determines validity of the one piece of software, based on a collation result which includes a result of determining whether the execution-time specific value matches one or none of the one or plurality of installation-time specific values, by causing the electronic device, the terminal device, or a different device to compare the execution-time specific value with the one or plurality of installation-time specific values,
 wherein the electronic device receives a calculated execution-time specific value from the terminal device and compares the calculated execution-time specific value with the one or plurality of installation-time specific values, and
 wherein the specific value is irreversibly and uniquely determined by inputting an execution instruction code of the software.

8. The electronic device according to claim 7, wherein the electronic device transmits to the terminal device the collation result which is the result of determining whether the execution-time specific value matches one or none of the one or plurality of installation-time specific values.

9. The electronic device according to claim 7, wherein, when new software is installed on the terminal device, the electronic device causes the terminal device to calculate and transmit a specific value uniquely calculated from the new software, as an installation-time specific value corresponding to the new software, and
 wherein, when the electronic device receives the installation-time specific value corresponding to the new software, the electronic device stores the installation-time specific value in addition to one or a plurality of other installation-time specific values.

10. A system, comprising:
- a first device where one or a plurality of pieces of software are installed and is configured to be executed; and
- a second device capable of communicating with the first device,
- wherein the second device stores specific values uniquely calculated respectively from the one or plurality of pieces of software installed on the first device, as one or a plurality of installation-time specific values,
- wherein the system causes the first device to calculate a specific value uniquely calculated from one piece of software, as an execution-time specific value, and determines that the software is authentic if the execution-time specific value matches one of the one or plurality of installation-time specific values stored in the second device,
- wherein the first device transmits a calculated execution-time specific value to the second device,
- wherein the second device compares the calculated execution-time specific value with the one or plurality of installation-time specific values, and transmits the comparison result to the first device, and
- wherein the specific is irreversibly and uniquely determined by inputting an execution instruction code of the software.

11. The system according to claim 10, wherein the first device continues communication with the second device if the comparison result indicates a match, and executes error processing if the comparison result indicates mismatches with all installation-time specific values.

12. The system according to claim 10, wherein the first device continues communication with the second device if the comparison result indicates a match, and deletes the software if the comparison result indicates mismatches with all installation-time specific values.

13. The system according to claim 10, further comprising a third device for relaying communication between the first device and the second device,
- wherein the second device stores the installation-time specific values, in association with a device, among the second device, the third device, and another device, that have installed software corresponding to the installation-time specific values on the first device, and
- wherein, if the execution-time specific value matches one of the one or plurality of installation-time specific values stored in the second device, the system determines that the software is authentic if the device associated with the installation-time specific value matches the third device, and determines that the software is fraudulent if the device does not match the third device.

14. The system according to claim 10, further comprising a third device for relaying communication between the first device and the second device,
- wherein the second device stores specific values uniquely calculated respectively from one or a plurality of pieces of software allowed to be installed on the first device in place of the one or plurality of pieces of software installed on the first device, as one or a plurality of installation-time specific values, and
- wherein the first device calculates the execution-time specific value when the one piece of software is installed on the first device, and the second device determines that the software is authentic if the execution-time specific value matches one of the one or plurality of installation-time specific values stored in the second device.

* * * * *